(12) United States Patent
Kadota

(10) Patent No.: US 10,409,534 B2
(45) Date of Patent: Sep. 10, 2019

(54) INFORMATION PROCESSING APPARATUS CAPABLE OF COMMUNICATING WITH PRINTER

(71) Applicant: BROTHER KOGYO KABUSHIKI KAISHA, Nagoya, Aichi (JP)

(72) Inventor: Masatoshi Kadota, Takahama (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 16/225,052

(22) Filed: Dec. 19, 2018

(65) Prior Publication Data

US 2019/0196765 A1   Jun. 27, 2019

(30) Foreign Application Priority Data

Dec. 26, 2017   (JP) .................................. 2017-249424

(51) Int. Cl.
 *G06F 3/12*   (2006.01)

(52) U.S. Cl.
 CPC .......... *G06F 3/1254* (2013.01); *G06F 3/1219* (2013.01); *G06F 3/1273* (2013.01); *G06F 3/1288* (2013.01)

(58) Field of Classification Search
 CPC .............................. G06F 3/1254; G06F 3/1219
 See application file for complete search history.

(56) References Cited

U.S. PATENT DOCUMENTS

| | | | |
|---|---|---|---|
| 5,982,994 A * | 11/1999 | Mori ..................... | B65H 31/24 358/1.15 |
| 6,985,245 B1 * | 1/2006 | Takahashi ............. | G06K 15/00 358/1.11 |
| 2010/0302580 A1 | 12/2010 | Miyata | |
| 2013/0077110 A1 * | 3/2013 | Ogino ................... | G06F 3/1253 358/1.12 |

FOREIGN PATENT DOCUMENTS

| | | |
|---|---|---|
| JP | 2003-029945 A | 1/2003 |
| JP | 2008-073901 A | 4/2008 |
| JP | 2009-230515 A | 10/2009 |
| JP | 2010-277246 A | 12/2010 |

* cited by examiner

*Primary Examiner* — Ibrahim Siddo
(74) *Attorney, Agent, or Firm* — Scully, Scott, Murphy & Presser, PC

(57) ABSTRACT

A non-transitory computer readable storage medium storing a set of program instructions for an information processing apparatus including: a processor; a communication interface; and a storage. The set of program instructions, when executed by the processor, causes the information processing apparatus to perform: acquire a print job; determining whether a second accumulated sheet number acquired from the printer is equal to a first accumulated sheet number acquired from the storage; when the second accumulated sheet number is different from the first accumulated sheet number, transmitting a first print job; and when the second accumulated sheet number is equal to the first accumulated sheet number, transmitting a second print job. The first print job includes a print command to insert the separating sheet (Continued)

for separating the acquired print job from another print job, while the second print job does not include the print command to insert the separating sheet.

11 Claims, 12 Drawing Sheets

FIG. 10

| SUBMIT TIME | IP ADDRESS | USER ID | JOB NAME | STATUS | PAPER SIZE |
|---|---|---|---|---|---|
| 2017/11/1:8:21 | 10.135.11.1 | ito | DOCUMENT 3 | QUEUED | A4 |
| 2017/11/1:8:20 | 10.135.11.1 | sato | DOCUMENT 2 | PRINTING | A4 |
| 2017/10/31:22:30 | 10.135.11.1 | sato | DOCUMENT 1 | PRINTED | A3 |
| 2017/10/31:21:50 | 10.135.11.2 | guest | FINANCIAL STATEMENT | PRINTED | A4 |
| 2017/10/30:5:20 | 10.135.11.2 | guest | INTERNAL MEMO | PRINTED | A3 |

INFORMATION PROCESSING APPARATUS CAPABLE OF COMMUNICATING WITH PRINTER

CROSS REFERENCE TO RELATED APPLICATION

This application claims priority from Japanese Patent Application No. 2017-249424 filed Dec. 26, 2017. The entire content of the priority application is incorporated herein by reference.

TECHNICAL FIELD

The present disclosure relates to a non-transitory computer readable storage medium storing a control program for an information processing apparatus that can communicate with a printer.

BACKGROUND

There has been known a technique inserting banner pages (separating sheets) between print jobs for easily distinguishing users that has printed sheets discharged from a printer. In one such technique described in Japanese Patent Application Publication No. 2003-29945, insertion of unnecessary banner pages between print jobs transmitted successively to a printer from the same user is omitted.

SUMMARY

In the conventional technique described above, the printer that receives print jobs identifies the users transmitted the print jobs and omits the insertion of banner pages between print jobs successively received from the same user. In order to implement this type of technique, the printer must be equipped with a special function for identifying the user of each print job and for determining whether the same user has transmitted successive print jobs.

In view of the foregoing, it is an object of the present disclosure to implement the technique described above without requiring the printer to be equipped with a special function.

In order to attain the above and other objects, according to one aspect, the disclosure provides a non-transitory computer readable storage medium storing a set of program instructions for an information processing apparatus. The information processing apparatus includes: a processor; a communication interface configured to allow the information processing apparatus to communicate with a printer; and a storage configured to store therein a first accumulated sheet number. The printer is configured to: receive a print job transmitted from the information processing apparatus via the communication interface; and each time the printer receives the print job from the information processing apparatus, execute a printing process based on the received print job, the printer storing therein a second accumulated sheet number, the printer being configured such that, each time the printer executes a printing process, the printer updates the second accumulated sheet number by adding the number of sheets that have been printed by the printer based on the print job. The set of program instructions, when executed by the processor, causes the information processing apparatus to perform: (a) acquiring a print job to be transmitted to the printer; (b) acquiring the second accumulated sheet number from the printer via the communication interface; (c) acquiring the first accumulated sheet number from the storage; (d) determining whether the acquired second accumulated sheet number is equal to the acquired first accumulated sheet number; when it is determined that the acquired second accumulated sheet number is different from the acquired first accumulated sheet number, (e) transmitting a first print job to the printer via the communication interface, wherein the first print job is such a print job that includes both the acquired print job and a print command indicating that a separating sheet should be inserted, the separating sheet serving as a boundary between the acquired print job and another print job; when it is determined that the acquired second accumulated sheet number is equal to the acquired first accumulated sheet number, (f) transmitting a second print job to the printer via the communication interface, wherein the second print job is such a print job that includes the acquired print job but does not include the print command indicating that the separating sheet should be inserted; and (g) updating the first accumulated sheet number stored in the storage by adding, to the acquired second accumulated sheet number, the number of sheets to be printed by the printer based on the transmitted print job.

According to another aspect, the disclosure provides a non-transitory computer readable storage medium storing a set of program instructions for an information processing apparatus. The information processing apparatus includes: a processor; a communication interface configured to allow the information processing apparatus to communicate with the printer; and a storage. The printer is configured to: receive a print job transmitted from the information processing apparatus via the communication interface, the print job including identification information used to identify a source of the print job; execute a printing process based on the received print job; and store therein the identification information included in the received print job. the set of program instructions, when executed by the processor, causes the information processing apparatus to perform: (a) acquiring a print job to be transmitted to the printer, the print job including identification information; (b) acquiring first identification information from the printer via the communication interface, the first identification information being the identification information stored in the printer and indicative of a source of a latest print job received by the printer; (c) acquiring second identification information, the second identification information being the identification information included in the acquired print job; (d) determining whether the acquired first identification information is the same as the acquired second identification information; when it is determined that the acquired first identification information is different from the acquired second identification information, (e) transmitting a first print job to the printer via the communication interface, wherein the first print job is such a print job that includes both the acquired print job and a print command indicating that a separating sheet should be inserted, the separating sheet serving as a boundary between the acquired print job and another print job; and when it is determined that the acquired first identification information is the same as the acquired second identification information, (f) transmitting a second print job to the printer via the communication interface, wherein the second print job is such a print job that includes the acquired print job but does not include the print command indicating that the separating sheet should be inserted.

According to still another aspect, the disclosure provides an information processing apparatus including: a processor; a communication interface configured to allow the information processing apparatus to communicate with a printer; and a storage configured to store therein a first accumulated sheet number. The printer is configured to: receive a print job transmitted from the information processing apparatus via the communication interface; and each time the printer receives the print job from the information processing apparatus, execute a printing process based on the received print job, the printer storing therein a second accumulated sheet number, the printer being configured such that, each time the printer executes a printing process, the printer updates the second accumulated sheet number by adding the number of sheets that have been printed by the printer based on the print job. The processor is configured to perform: (a) acquiring a print job to be transmitted to the printer; (b) acquiring the second accumulated sheet number from the printer via the communication interface; (c) acquiring the first accumulated sheet number from the storage; (d) determining whether the acquired second accumulated sheet number is equal to the acquired first accumulated sheet number; when it is determined that the acquired second accumulated sheet number is different from the acquired first accumulated sheet number, (e) transmitting a first print job to the printer via the communication interface, wherein the first print job is such a print job that includes both the acquired print job and a print command indicating that a separating sheet should be inserted, the separating sheet serving as a boundary between the acquired print job and another print job; when it is determined that the acquired second accumulated sheet number is equal to the acquired first accumulated sheet number, (f) transmitting a second print job to the printer via the communication interface, wherein the second print job is such a print job that includes the acquired print job but does not include the print command indicating that the separating sheet should be inserted; and (g) updating the first accumulated sheet number stored in the storage by adding, to the acquired second accumulated sheet number, the number of sheets to be printed by the printer based on the transmitted print job.

According to still another aspect, the disclosure provides an information processing apparatus comprising: a processor; a communication interface configured to allow the information processing apparatus to communicate with the printer; and a storage. The printer being configured to: receive a print job transmitted from the information processing apparatus via the communication interface, the print job including identification information used to identify a source of the print job; execute a printing process based on the received print job; and store therein the identification information included in the received print job. The processor is configured to perform: (a) acquiring a print job to be transmitted to the printer, the print job including identification information; (b) acquiring first identification information from the printer via the communication interface, the first identification information being the identification information stored in the printer and indicative of a source of a latest print job received by the printer; (c) acquiring second identification information, the second identification information being the identification information included in the acquired print job; (d) determining whether the acquired first identification information is the same as the acquired second identification information; when it is determined that the acquired first identification information is different from the acquired second identification information, (e) transmitting a first print job to the printer via the communication interface, wherein the first print job is such a print job that includes both the acquired print job and a print command indicating that a separating sheet should be inserted, the separating sheet serving as a boundary between the acquired print job and another print job; and when it is determined that the acquired first identification information is the same as the acquired second identification information, (f) transmitting a second print job to the printer via the communication interface, wherein the second print job is such a print job that includes the acquired print job but does not include the print command indicating that the separating sheet should be inserted.

BRIEF DESCRIPTION OF THE DRAWINGS

The particular features and advantages of the embodiment(s) as well as other objects will become apparent from the following description taken in connection with the accompanying drawings, in which:

FIG. 10 is a schematic diagram illustrating printing history information stored in a printer in the printing system according to the first embodiment;

DETAILED DESCRIPTION

First Embodiment

A printing system 1 according to a first embodiment of the present disclosure will be described with reference to FIGS. 1 through 9.

<Configuration of Printing System>

Figure 1:
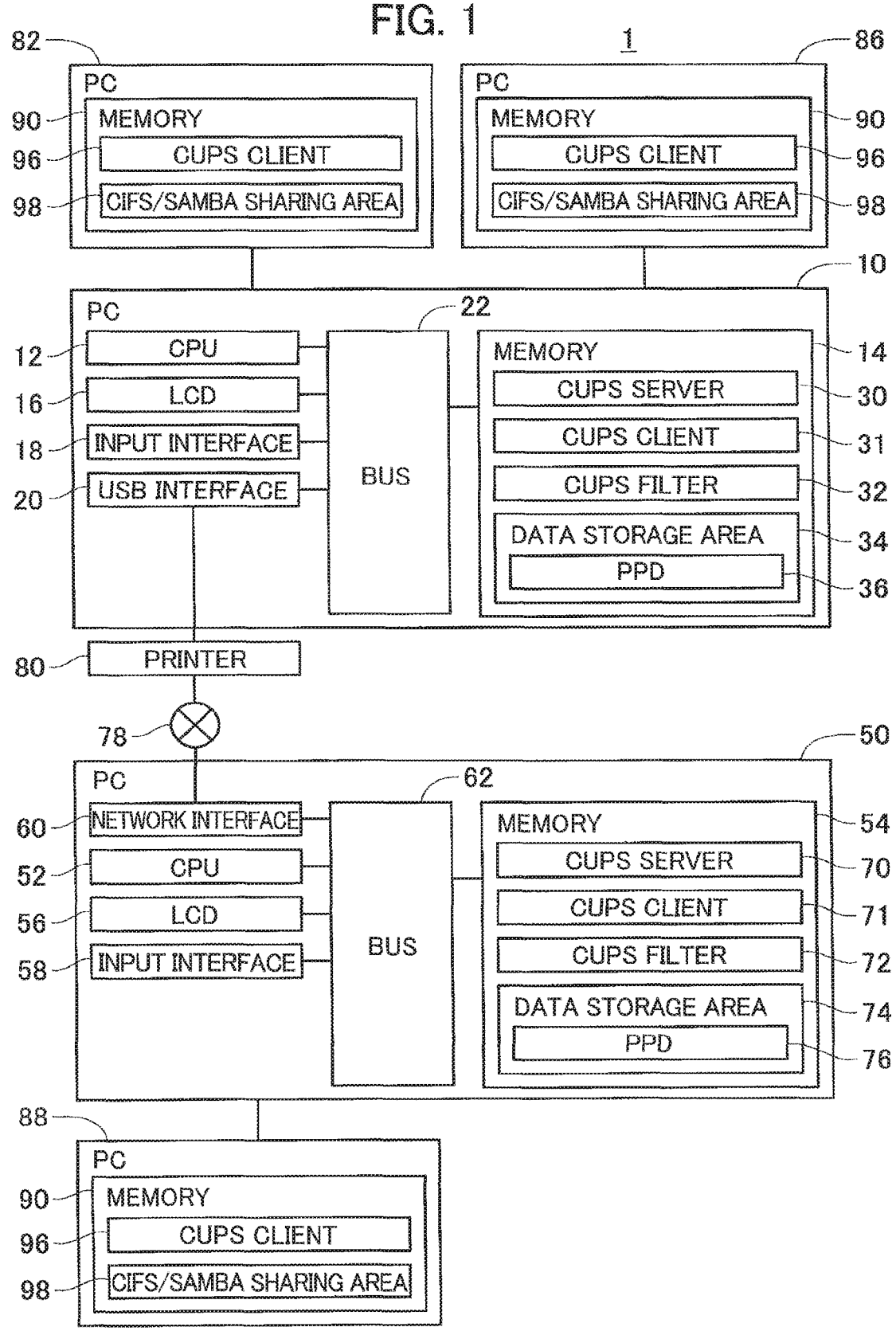
FIG. 1 is a block diagram of a printing system according to a first embodiment of the present disclosure.

FIG. 1 is a block diagram illustrating the printing system 1 according to the first embodiment. The printing system 1 illustrated in FIG. 1 includes a PC 10, a PC 50, a printer 80, a PC 82, a PC 86, and a PC 88. The PC 10 and the PC 50 are an example of the information processing apparatus. The PC 82, the PC 86, and the PC 88 are an example of the second information processing apparatus. The printer 80 is an example of the printer.

The PC 10 is capable of communicating with the PC 82 and PC 86. The PC 10 is configured with a printer sharing function for sharing the printer 80 with the PC 82 and PC 86. Here, the PC 10 functions as a server computer, while the PCs 82 and 86 function as client computers. A directory sharing function is enabled on each of the PCs 82 and 86 for sharing file directories with the PC 10. Similarly, the PC 50 can communicate with the PC 88. A printer sharing function on the PC 50 is enabled for sharing the printer 80 with the PC 88. Here, the PC 50 functions as a server computer, and the PC 88 functions as a client computer. A directory sharing function on the PC 88 is enabled to share a file directory with the PC 50.

The PC 10 is primarily provided with a central processing unit (CPU) 12 (an example of the processor), a memory 14, a liquid crystal display (LCD) 16, an input interface 18, and a USB interface 20 (examples of the communication interface and the USB interface). These components are capable of communicating with each other via a bus 22. Note that "interface" is also abbreviated as "I/F" in the drawings.

The CPU 12 executes processes according to a CUPS (Common Unix Printing System; registered trademark) server 30, a CUPS client 31, and a CUPS filter 32 (an example of the set of program instructions) provided in the memory 14. The CUPS server 30 and the CUPS client 31 serve to execute a printing process using Linux (registered trademark), while the CUPS filter 32 serves to execute a printing process on the printer 80. In the following description, the action of the CPU 12 executing the CUPS filter 32 and the like may be simply referred to by the program name. For example, the phrase "the CUPS filter 32" may be used to denote "the CPU 12 executing the CUPS filter 32."

The memory 14 is also provided with a data storage area 34 (an example of the storage). The data storage area 34 stores data and the like required for executing the CUPS filter 32 and the like, and includes a PostScript Printer Description (PPD) 36. The PPD 36 is a printer definition file used for performing a printing process. Here, the memory 14 is configured of a combination of storage that includes RAM, ROM, flash memory, a hard disk drive (HDD), and a buffer provided in the CPU 12.

The memory 14 may be any storage medium that can be read by a processor. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The LCD 16 is configured to display various functions of the PC 10. The input interface 18 is an interface that enables a user to input operations and includes a keyboard, mouse, and the like. The USB interface 20 serves to exchange signals with external devices in conformance with the USB standard. The USB interface 20 is connected to the printer 80. Through the USB interface 20, the PC 10 can exchange data with the printer 80.

The PC 50 is primarily provided with a CPU 52 (an example of the processor), a memory 54, an LCD 56, an input interface 58, and a network interface 60 (examples of the communication interface and the network interface). These components in the PC 50 are capable of communicating with each other via a bus 62. Since all of these components in the PC 50, excluding the network interface 60, are the same as the components in the PC 10, descriptions of these components will be omitted.

The network interface 60 serves to exchange signals with external devices via a network 78, such as a LAN. The network interface 60 is connected to the printer 80 via the network 78. Through the network interface 60, the PC 50 can exchange data with the printer 80. As with the memory 14 of the PC 10, the memory 54 is similarly provided with a CUPS server 70, a CUPS client 71, a CUPS filter 72 (an example of the set of program instructions), and a data storage area 74 that includes a PPD 76.

Each of the PC 82 and PC 86, which can communicate with the PC 10, and the PC 88, which can communicate with the PC 50, is provided with a memory 90. Each memory 90 has a CUPS client 96 and a CIFS/Samba sharing area 98. The CUPS client 96 serves to implement a printing process using Linux (registered trademark). The CIFS/Samba sharing area 98 is used for directory sharing. Naturally, each of the PCs 82, 86, and 88 is provided with a CPU, LCD and the like, but detailed description or illustration of these components are not provided in order to avoid complication of the description and the drawings. Further, the PCs 82, 86, and 88 are connected to the corresponding PCs 10 and 50 via networks, such as LANs.

<Operations of Printing System>

In the printing system 1 according to the present embodiment, the PCs 10 and 50 can transmit print jobs to the printer 80 and direct the printer 80 to execute a printing process based on the print jobs. Each of the PCs 82, 86, and 88 can also control the printer 80 to execute a printing process based on a print job by transmitting the print job to the corresponding PCs 10 and 50 with which each of the PCs 82, 86, and 88 can communicate and having the PCs 10 and 50 relay the print job to the printer 80.

In other words, the printer 80 in the printing system 1 can be used to execute printing processes based on print jobs created by each of the five PCs 10, 50, 82, 86, and 88. Since the printer 80 can execute printing processes based on print jobs created by multiple users, the printer 80 inserts a banner page at the front of a print job for each individual user. The banner page serves as a boundary used to differentiate pages printed by the printer 80 for each user. For example, if the printer 80 executes a printing process based on a print job transmitted from the PC 82 after executing a printing process based on a print job transmitted from the PC 10, the printer 80 inserts a banner page at the start of the print job transmitted from the PC 82.

On the other hand, if the printer 80 executes a printing process based on a print job transmitted from the PC 10 and subsequently executes a printing process based on another print job transmitted from the PC 10, the printer 80 does not insert a banner page at the start of the other print job, since both the preceding print job and the other print job subsequent thereto are created by the same user and there is no need to differentiate papers printed based on the two print jobs. Here, information that includes the user name, print job name, host name, and printing date and time is printed on each banner page, for example.

The printer 80 can insert a banner page before a print job, not only for each user, but also for each job. In other words, the printer 80 can insert a banner page at the beginning of a print job each time the printer 80 executes a print job. It is possible to select whether or not to insert a banner page for each user and for each job.

Figure 2:
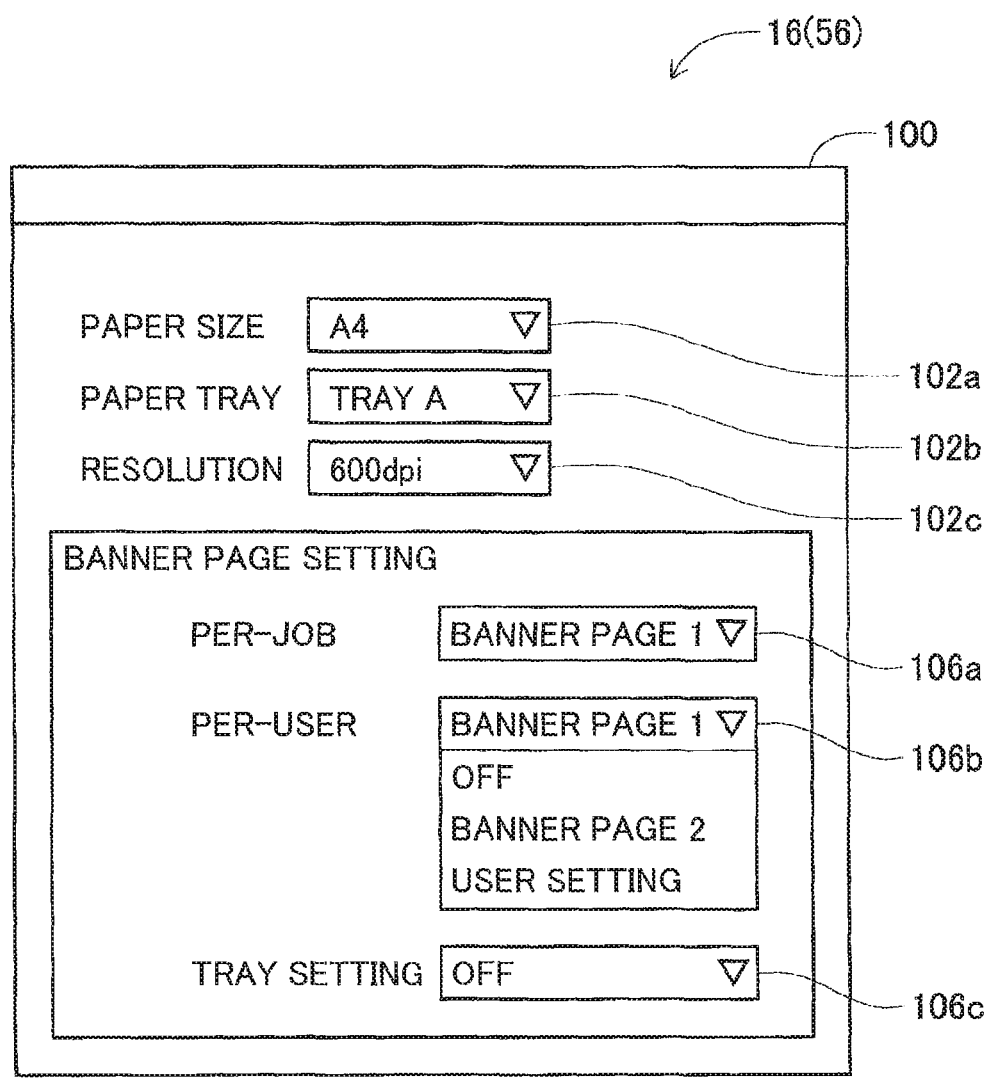
FIG. 2 is a schematic diagram illustrating a settings screen displayed on an LCD of a PC.

Specifically, when the user of one of the PCs 10, 50, 82, 86, and 88 issues a command to display a print settings screen for the printer 80, the PC displays a settings screen 100, such as that illustrated in FIG. 2, on the LCD 16 or the like of the PC. The image used to display the settings screen 100 is created based on information stored in the PPD 36 of the PC 10 and the PPD 76 of the PC 50. Therefore, when the settings screen 100 is displayed on the PC 10 or 50, the corresponding CUPS server 30 or 70 acquires information from the corresponding PPD 36 or 76 and displays the settings screen 100 on the corresponding LCD 16 or 56 based on this information.

Alternatively, when the settings screen 100 is displayed on the PC 82 or 86, the corresponding CUPS client 96 in the PC 82 or 86 acquires information from the PPD 36 in the PC 10 and displays the settings screen 100 on the corresponding LCD based on this information. When the settings screen 100 is displayed on the PC 88, the CUPS client 96 in the PC 88 acquires information from the PPD 76 in the PC 50 and displays the settings screen 100 on the LCD based on this information.

The settings screen 100 includes pull-down menus 102a-102c for setting various printing conditions for the printing process, and pull-down menus 106a-106c for setting conditions for inserting banner pages. The pull-down menu 102a is used to designate the size of the printing paper. The pull-down menu 102b is used to set the paper tray accommodating the printing paper of the size designated in the pull-down menu 102a, and the pull-down menu 102c is used to set the resolution for printing.

The pull-down menu 106a is used to set whether or not to insert a banner page for each job, and the pull-down menu 106b is used to set whether or not to insert a banner page for each user. When either the pull-down menu 106a or the pull-down menu 106b is operated, a pull-down list is displayed in the pull-down menu that includes the selections "Banner page 1", "Banner page 2", "User setting", and "OFF".

Each of the selections "Banner page 1", "Banner page 2", and "User setting" is an operating button for enabling the insertion of banner pages. When "Banner page 1" has been selected, a preset first default image is printed on a printing paper as a banner page and the banner page is inserted either for each job or for each user. When "Banner page 2" has been selected, a preset second default image is printed on a printing paper as a banner page and the banner page is inserted for each job or for each user. When "User setting" has been selected, a user-specified image set as desired by the user is printed on a printing paper as a banner page, and the banner page is inserted for each job or for each user. The selection "OFF" in the pull-down list is an operating button for disabling insertion of a banner page.

Here, image data for the first default image and the second default image is stored as part of the CUPS filters 32 and 72 in the memory 14 of the PC 10 and the memory 54 of the PC 50 at the same time the CUPS filter is installed. On the other hand, since a user-specified image can be set arbitrarily by the user, image data for the user-specified image is created on each of the PCs 10, 50, 82, 86, and 88. Image data for a user-specified image created on one of the PCs 10 and 50 is stored in the corresponding memories 14 and 54, while image data for a user-specified image created on one of the PCs 82, 86, and 88 is stored in the corresponding CIFS/Samba sharing area 98.

The pull-down menu 106c is used to set the paper tray for printing papers used as banner pages. In the present embodiment, the printer 80 is provided with trays A and B for supplying paper. The printer 80 can use at least one of the trays A and B for inserting banner pages. When the pull-down menu 106c has been operated, a pull-down list that includes "OFF", "Tray A", "Tray B", and "User setting" is displayed in the pull-down menu.

If "OFF" is selected in the pull-down list, banner pages are supplied from the tray the same as that designated for the print job (normally, the same tray designated in the pull-down menu 102b). If one of the trays "Tray A" and "Tray B" is selected in the pull-down list, the banner pages are supplied from the selected tray. Here, if the settings screen 100 is displayed on the LCD 16 of the PC 10 or the LCD 56 of the PC 50 and any one of the trays "Tray A" and "Tray B" is selected in the pull-down list, information for the selected tray is stored in the corresponding PPD 36 or 76. When the settings screen 100 is displayed on the LCD of one of the PCs 82, 86, and 88 and any one of the trays "Tray A" and "Tray B" is selected in the pull-down list, information for the selected tray is stored in the corresponding CIFS/Samba sharing area 98.

As described above, the user can set various conditions for the print job including settings for printing processes and settings for inserting banner pages (hereinafter referred to as "job conditions") through operations in the pull-down menus 102a-102c and the pull-down menus 106a-106c in the settings screen 100. After the user sets the job conditions and selects a print button (not illustrated), the relevant CUPS client 31 or 71 of the corresponding PC 10 or 50 creates a print job on a basis of image data representing the image to be printed (hereinafter referred to as "target image data") and information specifying the job conditions (hereinafter referred to as "conditions information"), or the relevant CUPS client 96 of the corresponding PC 82, 86, or 88 creates a print job based on the target image data and the conditions information.

The print job includes a user ID (an example of the identification information) for identifying the user. A unique user ID is designated for each user. This user ID is normally the login name used for logging in to the respective PCs 10, 50, 82, 86, and 88 and is automatically included in the print job by the corresponding CUPS client 31, 71, and 96. In this way, the source of the print job can be identified on a basis of the user ID included in the print job.

For example, the user ID is set to "ito", "sato", and the like for each user. However, if a user ID is not designated for the user, the user ID is set to "guest." This allows a user with no user ID to issue a print job under the user ID "guest," but the source of the print job cannot be identified using the user ID included in the print job in this case.

When the CUPS client 96 of one of the PCs 82 and 86 creates a print job, the CUPS client 96 transmits this print job to the CUPS server 30 of the PC 10. A print job created by the CUPS client 31 of the PC 10 is also transmitted to the CUPS server 30 of the PC 10. When the CUPS client 96 of the PC 88 creates a print job, the CUPS client 96 transmits this print job to the CUPS server 70 of the PC 50. A print job created by the CUPS client 71 of the PC 50 is also transmitted to the CUPS server 70 of the PC 50. The CUPS server 30 of the PC 10 outputs a print job received from the PC 82 or 86 or a print job created by the CUPS client 31 of the PC 10 itself to the CUPS filter 32. The CUPS server 70 of the PC 50 outputs a print job received from the PC 88 or a print job created by the CUPS client 71 of the PC 50 itself to the CUPS filter 72.

Next, process of the CUPS filter 32 or 72 performed after the CUPS filter 32 or 72 receives a print job will be described. Since the CUPS filter 32 and the CUPS filter 72 execute almost the same process, the process executed in accordance with the CUPS filter 32 will be used primarily in the following description. However, the CUPS filter 32 and CUPS filter 72 will be specifically mentioned in the processes that differ between the CUPS filter 32 and CUPS filter 72.

When the CUPS filter 32 receives a print job, the CUPS filter 32 converts the print job to page description language (PDL) data or other print data that the printer 80 can process and transmits this print data to the printer 80. The printer 80 executes a printing process based on the print job that has been converted to the print data.

Each time the printer 80 executes a printing process, the printer 80 cumulatively adds the number of sheets of paper printed in the printing process and stores therein the cumulative number of sheets (hereinafter referred to as "printer-side accumulated sheet number". The printer-side accumulated sheet number is normally used for multiple purposes, such as indicating when to perform required maintenance and to replenish consumables. Each of the PCs 10, 50, 82, 88, and 86 can read the printer-side accumulated sheet number through a prescribed procedure. Printer Job Language (PJL; registered trademark) is one common method used as the above prescribed procedure. The printer-side accumulated sheet number is an example of the second accumulated sheet number.

The CUPS filter 32 also stores a cumulative sheet number found by cumulatively adding the number of sheets to be printed based on print jobs transmitted to the printer 80 (hereinafter referred to as "PC-side accumulated sheet number") in the data storage area 34. More specifically, the CUPS filter 32 acquires the printer-side accumulated sheet number from the printer 80 prior to transmitting a print job to the printer 80. After transmitting the print job to the printer 80, the CUPS filter 32 adds the number of sheets to be printed based on the transmitted print job to the printer-side accumulated sheet number acquired from the printer 80 and stores the sum in the data storage area 34 as the PC-side accumulated sheet number. The PC-side accumulated sheet number is an example of the first accumulated sheet number.

After the printer 80 has completed a printing process based on a print job received from the CUPS filter 32, the printer 80 adds the number of sheets printed in the printing process to the printer-side accumulated sheet number stored in the printer 80 up to that point and stores this sum as the new printer-side accumulated sheet number. In other words, the printer 80 updates the printer-side accumulated sheet number each time a printing process based on a received print job is completed.

The PC-side accumulated sheet number stored in the data storage area 34 after the CUPS filter 32 has transmitted a print job to the printer 80 is normally the same as the printer-side accumulated sheet number updated by the printer 80 after the printer 80 has completed the printing process based on this print job. However, if the printer 80 receives a print job from the CUPS filter 72 (i.e., the PC 50) after completing a print job received from the CUPS filter 32 (i.e., the PC 10) and executes a printing process based on the print job received from the CUPS filter 72, the printer 80 will update the printer-side accumulated sheet number when this printing process is completed.

At this time, the printer-side accumulated sheet number updated upon completion of the printing process based on the print job received from the PC 50 is naturally greater than the PC-side accumulated sheet number stored in the data storage area 34 of the PC 10. Hence, the CUPS filter 32 can infer that the printer 80 has executed a printing process based on a print job received from the PC 50 when the printer-side accumulated sheet number acquired from the printer 80 is greater than the PC-side accumulated sheet number stored in the data storage area 34 of the PC 10.

Therefore, the CUPS filter 32 determines whether the device other than the PC10 has ordered a print job by comparing the acquired printer-side accumulated sheet number to the PC-side accumulated sheet number stored in the PC 10 prior to transmitting a print job to the printer 80. Specifically, the CUPS filter 32 extracts the conditions information from the print job stored in the data storage area 34 and determines based on the conditions information whether insertion of a per-user banner page has been enabled. The CUPS filter 32 determines that insertion of a per-user banner page has been enabled when one of the "Banner page 1", "Banner page 2", and "User setting" has been selected in the pull-down menu 106b in the settings screen 100, and determines that insertion of a per-user banner page has been disabled when "OFF" has been selected.

When insertion of a per-user banner page has been enabled, the CUPS filter 32 acquires the printer-side accumulated sheet number from the printer 80 and acquires the PC-side accumulated sheet number stored in the data storage area 34 prior to transmitting the print job to the printer 80. When the printer-side accumulated sheet number is greater than the PC-side accumulated sheet number, the CUPS filter 32 transmits the print job to the printer 80 such that a banner page is inserted in front of the pages to be printed based on the target image data (hereinafter referred to as "normal pages").

Specifically, when the image to be printed on a printing paper used as a banner page is set to the first default image or the second default image, the CUPS filter 32 acquires image data for the first default image or the second default image from the memory 14. When the image to be printed on a printing paper used as a banner page is set to the user-specified image, the CUPS filter 32 determines whether the source of the print job is the PC 10 or one of the PCs 82 and 86. In other words, the CUPS filter 32 determines whether the source of the print job is a server computer or a client computer.

When the source of the print job is a server computer, the CUPS filter 32 acquires image data for the user-specified image from a storage area corresponding to the user that ordered the print job among storage areas provided for each user in the memory 14 of the PC 10. When the source of the print job is a client computer, the CUPS filter 32 acquires image data for the user-specified image from a storage area corresponding to the user that ordered the print job among storage areas provided for each user in the CIFS/Samba sharing area 98 of the client computer.

Note that when either "Banner page 1" or "Banner page 2" has been selected in the pull-down menu 106b of the settings screen 100, the CUPS filter 32 determines that the image to be printed on a printing paper for the banner page is either the first default image or the second default image, respectively. When "User setting" has been selected, the CUPS filter 32 determines that the image to be printed on the printing paper for the banner page has been set to the user-specified image.

If image data for the user-specified image cannot be acquired from the client computer, the CUPS filter 32 executes an error process. In the error process, the CUPS filter 32 displays an error screen, halts the print job, and the like.

When the paper tray of the printing paper for banner pages is set to "Tray A" or "Tray B", information on the selected paper tray for banner pages (hereinafter referred to as "tray information") is included in the conditions information included in the print job in the data storage area 34. In this case, the CUPS filter 32 extracts tray information from the conditions information included in the print job. When the paper tray for the printing paper used as banner pages is set to "User setting", the CUPS filter 32 determines whether the source of the print job is the PC 10 or one of the PCs 82 and 86. In other words, the CUPS filter 32 determines whether the source of the print job is a server computer or a client computer.

When the source of the print job is a server computer, the CUPS filter 32 acquires the tray information from a storage area corresponding to the user that ordered the print job among the storage areas provided for each user in the memory 14 of the PC 10. When the source is a client computer, the CUPS filter 32 acquires the tray information from a storage area corresponding to the user that ordered the print job among the storage areas provided for each user in the CIFS/Samba sharing area 98 of the client computer. Note that if tray information cannot be acquired from the client computer, the CUPS filter 32 executes an error process. Further, when the paper tray for banner pages is set to "OFF", the CUPS filter 32 acquires information on the paper tray specified for the print job to be used as the tray information for the banner page.

After acquiring image data for the image to be printed on the printing paper for banner pages and the tray information for banner pages, the CUPS filter 32 transmits the acquired image data and tray information to the printer 80 together with a command to print the banner page. Upon receiving this print command for the banner page, the printer 80 feeds a printing paper from the paper tray corresponding to the tray information received together with the print command and prints an image on the printing paper for the banner page based on the image data received together with the print command. Consequently, a banner page with a prescribed image printed thereon is discharged from the printer 80.

After transmitting the print command for the banner page, the CUPS filter 32 also transmits a print command for the normal pages to the printer 80. Here, the CUPS filter 32 transmits the target image data stored in the data storage area 34 and information related to print settings included in the conditions information to the printer 80 together with the print command for normal pages.

Upon receiving the print command for normal pages, the printer 80 executes a printing process based on the target image data received with the print command and in accordance with the information related to print settings received with the print command. Consequently, normal pages with images printed based on the target image data are discharged from the printer 80 following the previously discharged banner page. When the printer 80 inserts a banner page at the beginning of the print job received from the PC 10 in this way, users can easily distinguish the normal pages printed immediately before (i.e., the normal pages printed according to a print job received from the PC 50) from the normal pages printed according to the print job received from the PC 10.

When the CUPS filter 32 determines that the printer-side accumulated sheet number is smaller than the PC-side accumulated sheet number prior to transmitting a planned print job to the printer 80, it is likely that the CUPS filter 32 has already transmitted a separate print job to the printer 80 prior to the planned print job and that the printer 80 has not completed the printing process based on the separate print job (i.e., the other print job is currently being executed). In other words, the printer 80 will likely be executing consecutive print jobs created by the same user, and the CUPS filter 32 can infer that the insertion of a per-user banner page is not needed. However, there is a chance that the printing process based on the consecutive print jobs have been interrupted by another print job, depending on types of communication interface used between the PCs 10 and 50 and the printer 80.

More specifically, the PC 10 uses the USB interface 20 as a communication interface in the present embodiment. Thus, when the PC 10 and the printer 80 are communicating with each other via the USB interface 20, another device cannot interrupt this communication by transmitting a print job to the printer 80. In other words, if the CUPS filter 32 transmits a print job to the printer 80 after determining that the printer-side accumulated sheet number is smaller than the PC-side accumulated sheet number, the printer 80 will always execute the planned print job created on the PC 10 subsequent to the current printing process for a separate print job created on the PC 10. Hence, there is no need to insert a per-user banner page between the planner print job and the separate print job.

Therefore, when the CUPS filter 32 determines that the printer-side accumulated sheet number is smaller than the PC-side accumulated sheet number prior to transmitting a print job to the printer 80, the CUPS filter 32 does not transmit a print command for a banner page but only transmits a print command for the normal pages on the condition that the PC 10 transmitting the print job employs the USB interface 20 as a communication interface. Consequently, a per-user banner page is not inserted between two print jobs created by the same user, thereby reducing consumption of banner pages.

On the other hand, the PC 50 uses the network interface 60 as a communication interface in the present embodiment. Hence, when the PC 50 and the printer 80 are communicating with each other via the network interface 60, another device can interrupt this communication by transmitting a print job to the printer 80. In other words, if the CUPS filter 72 transmits a planned print job to the printer 80 after determining that the printer-side accumulated sheet number is smaller than the PC-side accumulated sheet number, there is a possibility that the printer 80 will receive a print job in the meantime from another device, such as the PC 10. The print job sent from the other device may interrupt (i.e., be printed before) the planned print job sent from the CUPS filter 72. Hence, it is preferable that the CUPS filter 72 inserts a per-user banner page before the planned print job.

Therefore, even if the CUPS filter 72 determines that the printer-side accumulated sheet number is smaller than the PC-side accumulated sheet number prior to transmitting a print job to the printer 80, when the PC 50 that transmitted the print job uses the network interface 60 as the communication interface, the CUPS filter 72 first transmits a print command for a banner page and subsequently transmits a print command for the normal pages. In this way, a per-user banner page can be inserted when there is a possibility that the printer 80 might first be executing a printing process based on a print job created by a different user.

Further, when the CUPS filter 32 determines that the printer-side accumulated sheet number is the same as the PC-side accumulated sheet number prior to transmitting a planned print job to the printer 80, the CUPS filter 32 confirms the status of the printer 80. When the printer 80 is in a non-receiving state (i.e., the printer 80 is not printing job or not currently receiving a print job), it is likely that the CUPS filter 32 transmitted a separate print job prior to the planned print job and that the printer 80 has already completed the printing process based on the separate print job. That is, since the printer 80 has completed a print job previously transmitted from the CUPS filter 32, it is likely sufficient to transmit a print command for the normal pages as the planned print job without first transmitting a print command for a per-user banner page. The non-receiving state of the printer is an example of the standby state of the printer.

On the other hand, when the printer 80 is in a receiving state (i.e., the printer 80 is currently printing or receiving a print job), it is possible that a print job transmitted from the CUPS filter 32 has been completed but that a printing process based on a print job transmitted from another device is currently being executed. This is because the printer-side accumulated sheet number is not updated until the print job transmitted from the other device is completed.

Accordingly, even if the CUPS filter 32 determines that the printer-side accumulated sheet number is the same as the PC-side accumulated sheet number prior to transmitting the planned print job to the printer 80, when the CUPS filter 32 transmits the planned print job while the printer 80 is executing a printing process based on a print job transmitted from another device, the planned print job transmitted by the CUPS filter 32 will be executed after the print job transmitted from the other device.

Further, when the printer 80 is in the receiving state, it is possible that the printer 80 may be receiving a print job from another device prior to completing the print job received from the CUPS filter 32 or after completing this print job. Accordingly, if the CUPS filter 32 transmits another print job at this timing, the other print job will be executed after a print job transmitted from the other device. In other words, even if the CUPS filter 32 determines that the printer-side accumulated sheet number is the same as the PC-side accumulated sheet number prior to transmitting the planned print job to the printer 80, the CUPS filter 32 must transmit a print command for a per-user banner page when the printer 80 is currently executing a printing process and when the printer 80 is currently receiving a print job.

In order to confirm the status of the printer 80, the CUPS filter 32 acquires information that indicates the status of the printer 80 (hereinafter referred to as "status information") from the printer 80. In the present embodiment, status information includes information indicating that a printing process is being executed, information indicating that a print job is being received, and information indicating that a print job is not being received (i.e., the printer 80 is idling). Thus, when the CUPS filter 32 determines that the printer-side accumulated sheet number is the same as the PC-side accumulated sheet number prior to transmitting a planned print job to the printer 80, and when the acquired status information indicates that the printer 80 is idling (i.e., the printer 80 is in the non-receiving state), the CUPS filter 32 transmits a print command for normal pages without transmitting a print command for a per-user banner page as the planned print job. This print job transmitted with a print command for normal pages but without a print command for a per-user banner page is an example of a second print job.

On the other hand, when the CUPS filter 32 determines that the printer-side accumulated sheet number is the same as the PC-side accumulated sheet number prior to transmitting a planned print job to the printer 80, and status information indicates that a printing process is being executed or a print job is being received (i.e., the printer 80 is in the receiving state), the CUPS filter 32 transmits a print command for normal pages after transmitting a print command for a per-user banner page as the planned print job. The print job transmitted with both a print command for normal pages and a print command for a per-user banner page is an example of a first print job.

By using the printer-side accumulated sheet number and the PC-side accumulated sheet number in this way, the CUPS filter 32 can accurately determine whether the print job planned to be transmitted from the PC 10 will be executed subsequent to a print job transmitted from a device other than the PC 10 (that is, the PC 50) and can reliably determine whether the insertion of a per-user banner page is required.

However, the PC 10 transmits not only print jobs created on the PC10 itself, but also print jobs created on the PCs 82 and 86. Accordingly, this determination technique using the printer-side accumulated sheet number and the PC-side accumulated sheet number cannot determine whether the print job transmitted from the PC 10 to the printer 80 is a print job created on the PC 10 or a print job created on one of the PCs 82 and 86.

Therefore, the CUPS filter 32 determines the source of a print job using the user ID included in the print job. Since the source of the print job can be identified on a basis of the user ID as described above, the CUPS filter 32 can use this user ID to determine whether the print job transmitted from the PC 10 to the printer 80 was created on the PC 10 or on one of the PCs 82 and 86. In this way, if the planned print job is transmitted after another print job is transmitted, the CUPS filter 32 can determine whether the user for the planned print job is the same as the user for the previously transmitted print job (i.e., the other print job). That is, the CUPS filter 32 can also determine whether or not to insert a per-user banner page in the above case.

Hence, prior to transmitting a planned print job, the CUPS filter 32 determines whether the user ID included in the planned print job is the same as the user ID included in the preceding print job (the print job transmitted to the printer 80 immediately before the planned print job is transmitted). In other words, the CUPS filter 32 determines whether the user for the planned print job is the same as the user for the preceding print job. When the user for the planned print job is different from the user for the preceding print job, the CUPS filter 32 first transmits a print command for a per-user banner page and subsequently transmits a print command for the normal pages as the planned print job.

On the other hand, when the CUPS filter 32 determines that the user for the current print job is the same as the user for the preceding print job, the CUPS filter 32 determines whether to insert a per-user banner page based on the printer-side accumulated sheet number and the PC-side accumulated sheet number as described above, and transmits the print job to the printer 80 according to the determination results.

The user ID "guest" is assigned to those users who do not have a user ID. If the user ID included in a print job is "guest", the source of the print job cannot be identified from the user ID. Accordingly, since the CUPS filter 32 cannot determine whether the user for the planned print job is the same as the user for the preceding print job when the planned print job includes the user ID "guest", the CUPS filter 32 transmits a print command for a per-user banner page followed by a print command for the normal pages as the planned print job. In this way, a per-user banner page is inserted when there is a possibility that the user who for planned print job is the same as the user for the preceding print job.

Further, when the settings for inserting a per-job banner page has been enabled, the CUPS filter 32 transmits a print command for a per-job banner page to the printer 80 each time a print job is transmitted to the printer 80. Specifically, the CUPS filter 32 extracts the conditions information from the print job stored in the data storage area 34 and determines based on the conditions information whether the setting for inserting a per-job banner page has been enabled. Incidentally, the CUPS filter 32 determines that the settings for inserting a per-job banner page has been enabled when any one of the "Banner page 1", "Banner page 2", and "User setting" has been selected in the pull-down menu 106*a* of the settings screen 100 and determines that the settings for inserting a per-job banner page has been disabled when "OFF" has been selected in the pull-down menu 106*a*.

When the CUPS filter 32 determines that the settings for inserting a per-job banner page is enabled, the CUPS filter 32 acquires image data for the image to be printed on a printing paper for a banner page and tray information for the paper tray used to feed the printing paper for the banner page. The method of acquiring image data for the image to be printed on printing paper for per-job banner pages and tray information for the tray for the per-job banner pages is identical to the method used to acquire the image data for the image to be printed on the printing papers for the per-user banner pages and the tray information for the tray for the per-user banner pages.

After acquiring image data for the image for banner pages and tray information for the paper tray to be used for banner pages, the CUPS filter 32 transmits this image data and tray information to the printer 80 together with a command to insert a per-job banner page. After transmitting this command to print the per-job banner page, the CUPS filter 32 transmits a print command for the normal pages to the printer 80. In this way, a banner page is inserted at the beginning of each print job, thereby enabling users to easily differentiate print jobs.

When both the settings for inserting a per-job banner page and the settings for inserting a per-user banner page have been enabled, insertion of the per-job banner page is prevented when inserting a per-user banner page. This can prevent both a per-user banner page and a per-job banner page being inserted at the same location, thereby preventing unnecessary insertion of banner pages.

Thus, when transmitting a print job to the printer 80, the PCs 10 and 50 determine whether a banner page is to be inserted and transmit a print command for a banner page to the printer 80 when determining a banner page is to be inserted. In this way, the PCs 10 and 50 can insert a banner page when needed, such as between two print jobs created by different users, without necessitating that the printer 80 have a special function.

That is, in the conventional technique, the printer determines whether a banner page should be inserted and executes a printing process for a banner page based on the determination results. However, it is difficult to incorporate this type of mechanism in general-purpose printers. Thus, configuring the PCs 10 and 50 to determine whether a banner page is to be inserted and to transmit a print command for the banner page to the printer 80 enables banner pages to be inserted by general-purpose printers when required.

<Process of CUPS Filter>

By executing the CUPS filter 32 or 72, the corresponding CPU 12 or 52 performs processes that determines whether insertion of banner pages has been enabled, transmits print commands for banner pages, and transmits print commands for normal pages. Since the process executed in accordance with the CUPS filter 32 and the process executed in accordance with the CUPS filter 72 are the same, only the process executed in accordance with the CUPS filter 32 will be described based on the flowcharts illustrated in FIGS. 3 through 9, while omitting description as to the process executed in accordance with the CUPS filter 72.

Figure 3:
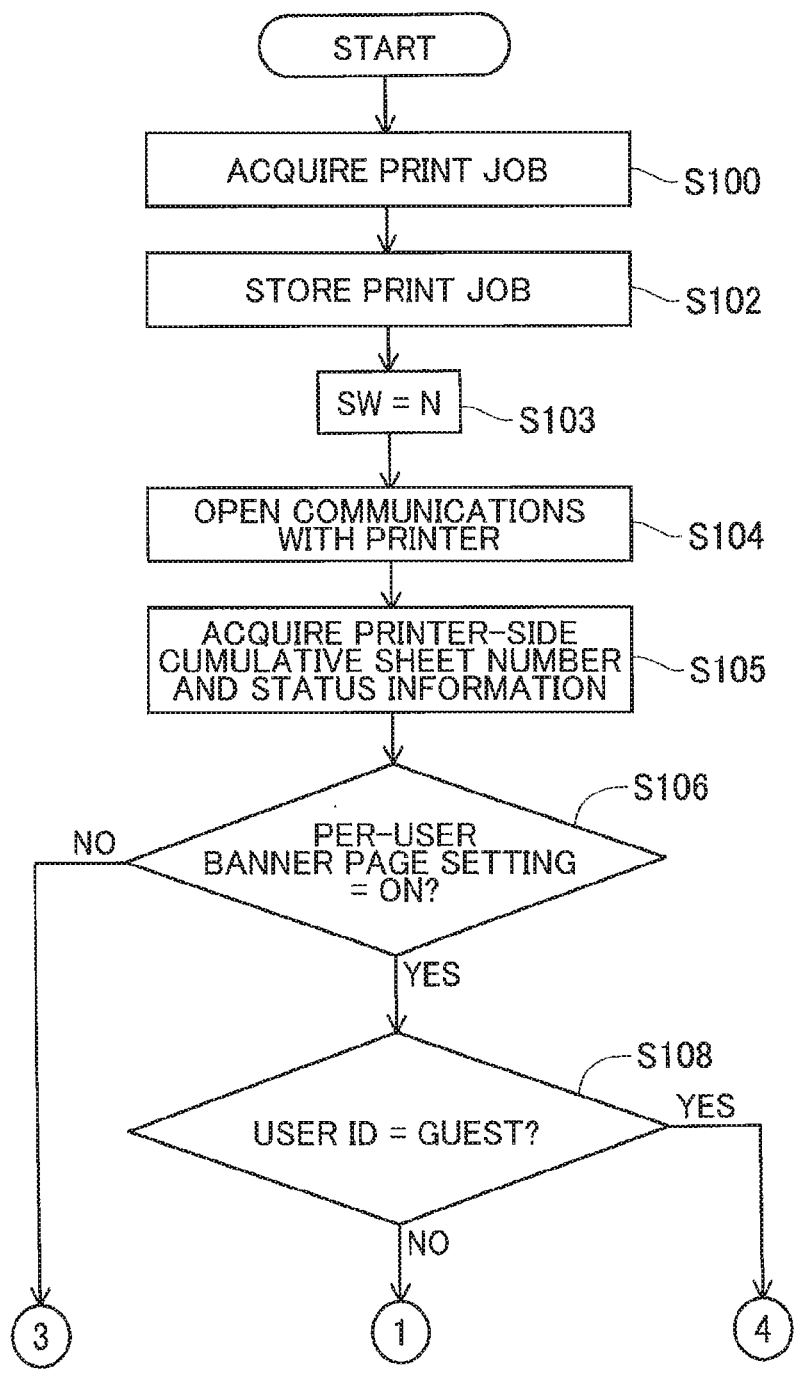
FIG. 3 is a flowchart illustrating steps in a process performed in accordance with a CUPS filter of the PC in the printing system according to the first embodiment.
Figure 4:
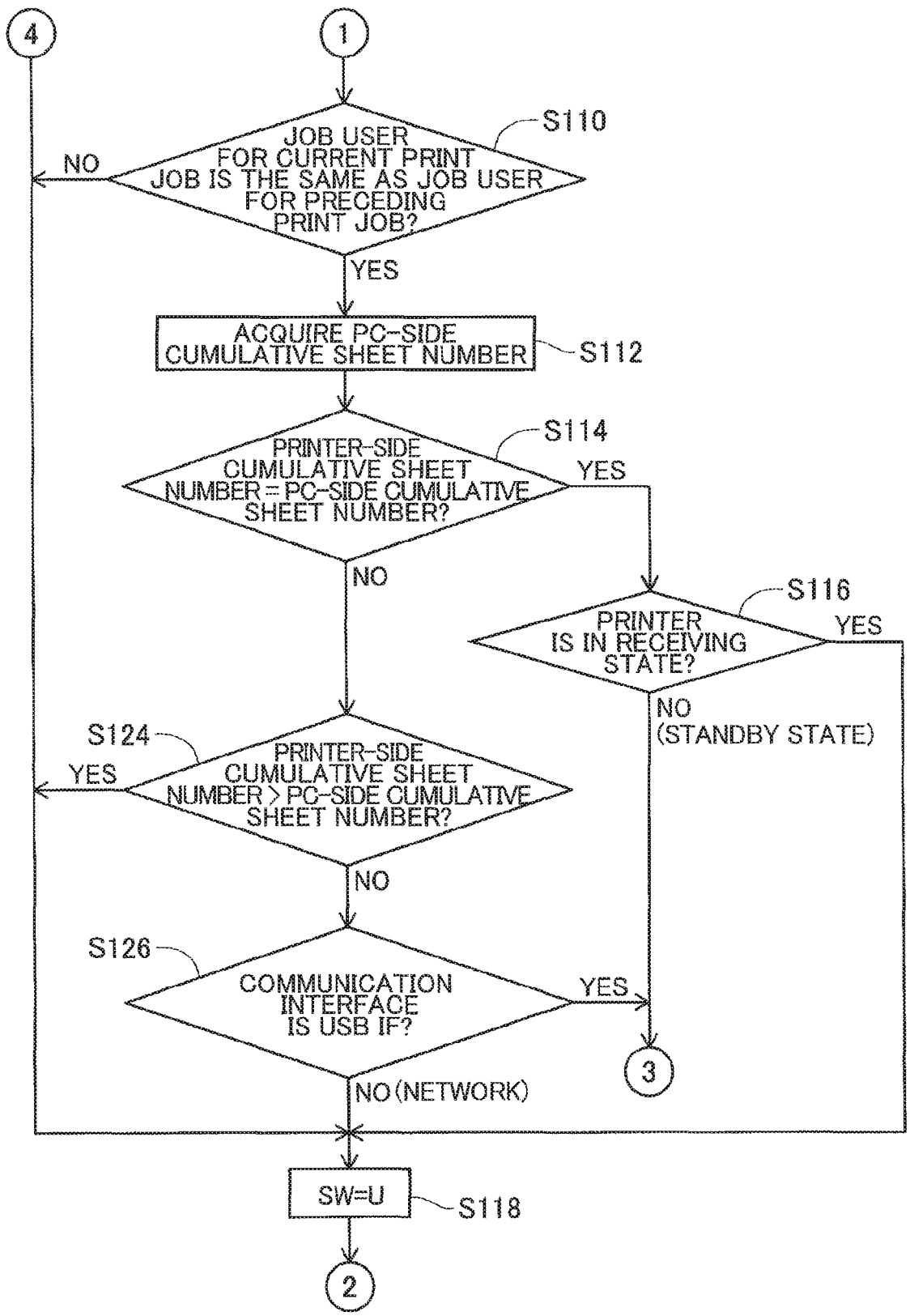
FIG. 4 is a flowchart illustrating steps in a process performed in accordance with the CUPS filter of the PC in the printing system according to the first embodiment.
Figure 5:
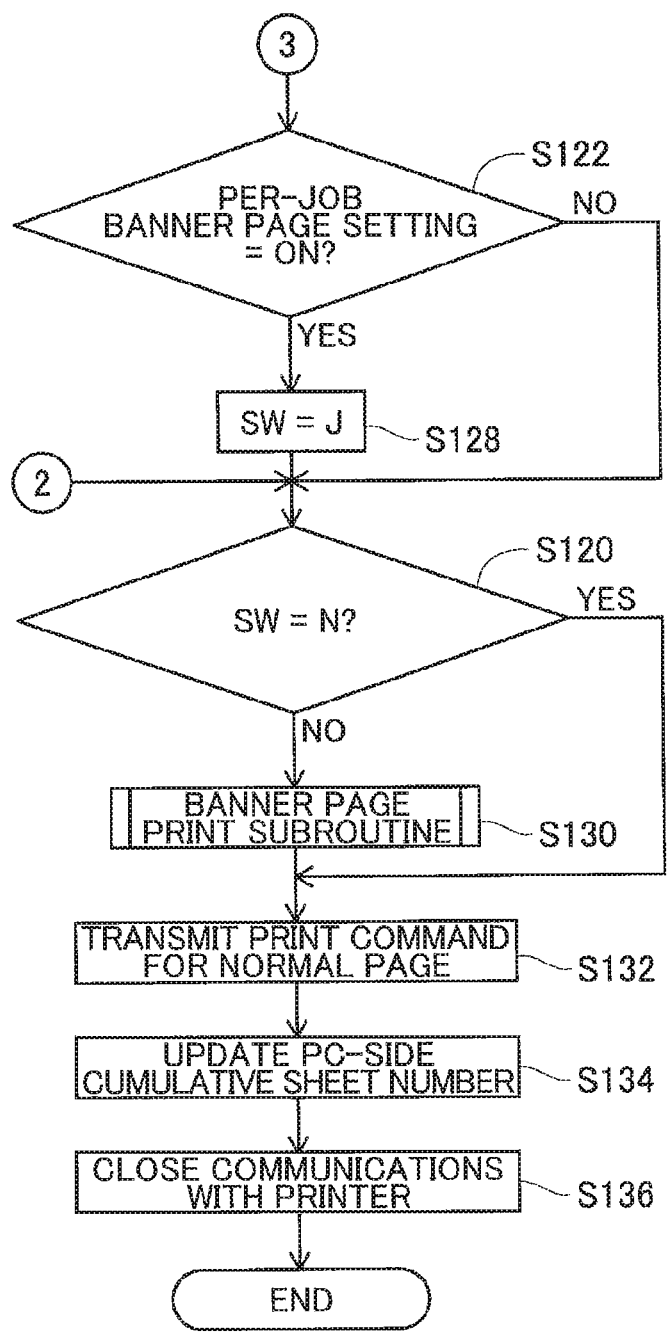
FIG. 5 is a flowchart illustrating steps in a process performed in accordance with the CUPS filter of the PC in the printing system according to the first embodiment.

In S100 at the beginning of FIG. 3, the CUPS filter 32 acquires a print job outputted by the CUPS server 30. More specifically, the CUPS filter 32 acquires a print job transmitted from the PCs 82, 86, or a print job created in the PC 10 itself. In S102 the CUPS filter 32 stores the print job acquired from the CUPS server 30 in the data storage area 34. In S103 the CUPS filter 32 sets a flag SW to "N". The flag SW indicates whether insertion for either a per-job banner page or a per-user banner page has been enabled. SW="N" indicates that insertion for neither the per-job banner page nor the per-user banner page has been enabled.

In S104 the CUPS filter 32 transmits a command to the operating system (OS) of the PC 10 to open communications with the printer 80. In S105 the CUPS filter 32 acquires the printer-side accumulated sheet number and status information from the printer 80. In S106 the CUPS filter 32 determines based on conditions information included in the print job stored in the data storage area 34 whether the per-user banner page setting is set to ON, i.e., whether insertion of the per-user banner page has been enabled.

When the per-user banner page setting is set to ON (S106: YES), in S108 the CUPS filter 32 acquires the user ID included in the print job stored in the data storage area 34 and determines whether the acquired user ID is set to "guest". When the user ID is "guest" (S108: YES), in S118 the CUPS filter 32 sets the flag SW to "U" and advances to S120. Here, SW="U" indicates that a per-user banner page is to be inserted.

When the user ID is not "guest" (S108: NO), in S110 the CUPS filter 32 determines whether the user operating the PC which is the source of the current print job (hereinafter referred to as "job user for the current print job") is the same as the user operating the PC which is the source of a print job that has been transmitted immediately before the current print job is transmitted (hereinafter referred to as "job user for the preceding print job"). More specifically, in S110 the CUPS filter 32 determines whether the user ID included in the current print job is the same as the user ID of the preceding print job which is maintained in the memory 14. When the job user for the current print job is different from the job user for the preceding print job (S110: NO), in S118 the CUPS filter 32 sets the flag SW to "U" and advances to S120.

On the other hand, when the job user for the current print job is the same as the job user for the preceding print job (S110: YES), in S112 the CUPS filter 32 acquires the PC-side accumulated sheet number from the data storage area 34. Subsequently, in S114 the CUPS filter 32 determines whether the printer-side accumulated sheet number acquired from the printer 80 in S105 is the same as the PC-side accumulated sheet number acquired from the data storage area 34 in S112.

When the printer-side accumulated sheet number is different from the PC-side accumulated sheet number (S114: NO), in S124 the CUPS filter 32 determines whether the printer-side accumulated sheet number is greater than the PC-side accumulated sheet number. When the printer-side accumulated sheet number is greater than the PC-side accumulated sheet number (S124: YES), in S118 the CUPS filter 32 sets the flag SW to "U" and advances to S120.

On the other hand, when the printer-side accumulated sheet number is smaller than the PC-side accumulated sheet number (S124: NO), in S126 the CUPS filter 32 determines whether the communication interface with the printer 80 is the USB interface 20. When the communication interface with the printer 80 is not the USB interface 20 (S126: NO), in S118 the CUPS filter 32 sets the flag SW to "U" and advances to S120. On the other hand, when the communication interface with the printer 80 is the USB interface 20 (S126: YES), the CUPS filter 32 advances to S122.

Alternatively, when the CUPS filter 32 determines in S114 that the printer-side accumulated sheet number is the same as the PC-side accumulated sheet number (S114: YES), in S116 the CUPS filter 32 determines based on the status information acquired in S105 whether the printer 80 is in the receiving state (i.e., the printer 80 is currently printing or receiving a print job). When the printer 80 is in the receiving state (S116: YES), in S118 the CUPS filter 32 sets the flag SW to "U" and advances to S120. On the other hand, when the printer 80 is in the non-receiving state (i.e., the printer 80 is not printing or not currently receiving a print job) (S116: NO), the CUPS filter 32 advances to S122. Note that the CUPS filter 32 also advances to S122 when the per-user banner page setting is set to OFF in S106 (S106: NO).

In S122 the CUPS filter 32 determines based on the conditions information included in the print job stored in the data storage area 34 whether the setting for the per-job banner page is set to ON, i.e., whether insertion of per-job banner pages has been enabled. When the per-job banner page setting is set to ON (S122: YES), in S128 the CUPS filter 32 sets the flag SW to "J" and advances to S120. Here, SW="J" Indicates that a per-job banner page is to be inserted. On the other hand, when the per-job banner page setting is set to OFF (S122: NO), the CUPS filter 32 skips S128 and advances directly to S120.

In S120 the CUPS filter 32 determines whether the flag SW is set to "N". When the flag SW is not set to "N" (S120: NO), i.e., when the flag SW is set to "U" or "J", in S130 the CUPS filter 32 executes a banner page print subroutine illustrated in FIGS. 6 through 9.

Figure 6:
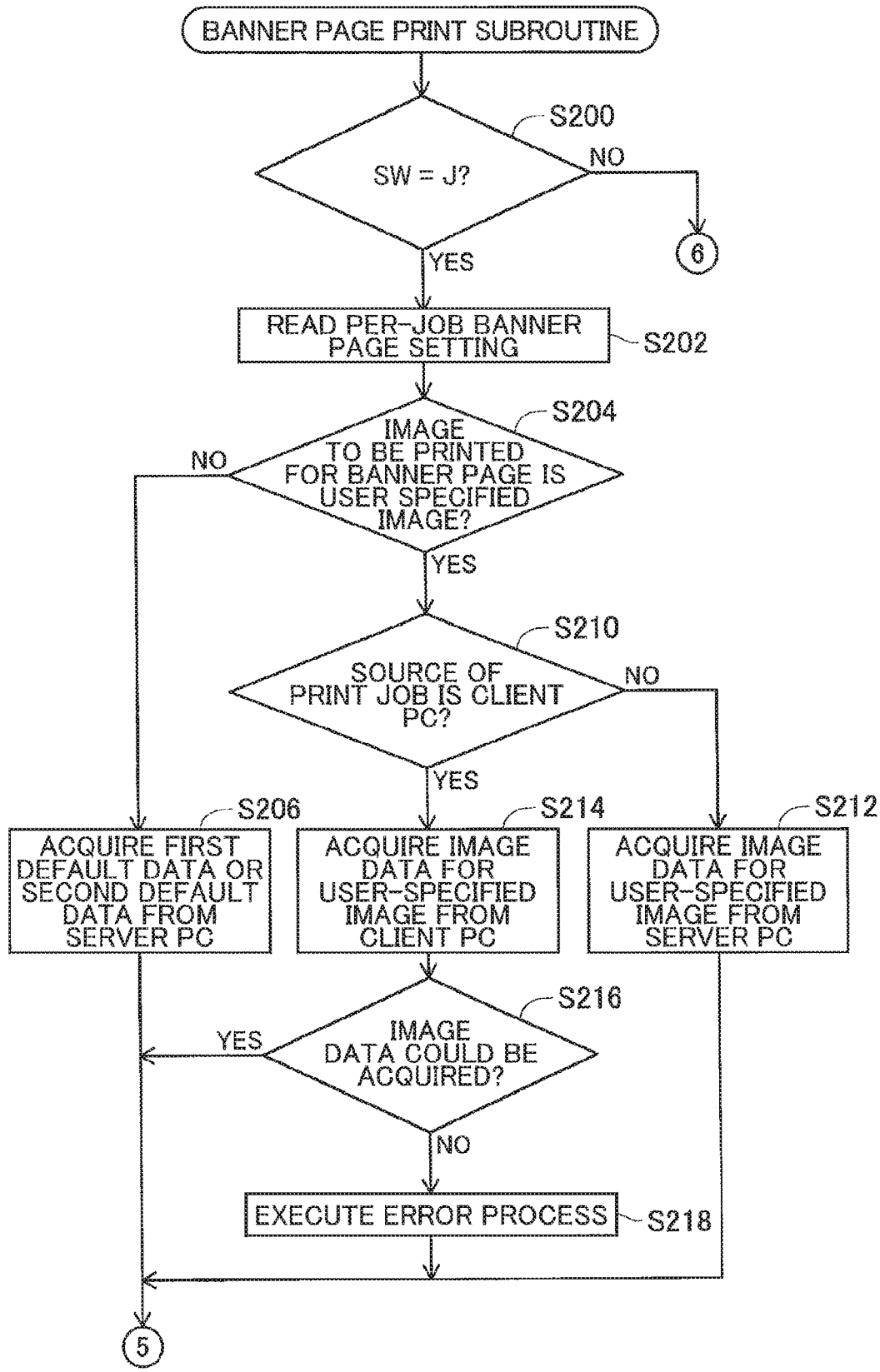
FIG. 6 is a flowchart illustrating steps in a banner page print subroutine performed in accordance with the CUPS filter of the PC in the printing system according to the first embodiment.

In S200 of the banner page print subroutine, as illustrated in FIG. 6, the CUPS filter 32 determines whether the flag SW is set to "J". When the flag SW is set to "J" (S200: YES), in S202 the CUPS filter 32 reads the per-job banner page setting. In other words, the CUPS filter 32 reads information related to the per-job banner page setting from the conditions information included in the print job stored in the data storage area 34. Then in S204 the CUPS filter 32 determines based on the information read in S202 whether the image printed for the banner page is set to a user-specified image.

When the image to be printed for the banner page is not set to a user-specified image (S204: NO), i.e., the image to be printed for the banner page is set to the first default image or the second default image, in S206 the CUPS filter 32 acquires image data for the first default image or the second default image from the server computer (i.e., from the memory 14 of the PC 10 in this case), and subsequently advances to S208.

On the other hand, when the image to be printed for the banner page is set to a user-specified image (S204: YES), in S210 the CUPS filter 32 determines whether the source of the print job stored in the data storage area 34 is a client computer. That is, the CUPS filter 32 determines whether the user ID included in the print job stored in the data storage area 34 indicates one of the PC 82 and the PC 86. Alternatively, information indicating the source of the print job may be included in the print job, and the CUPS filter 32 may determine the source of the print job based on this information.

When the source of the print job is a server computer (S210: NO), i.e., the user ID included in the print job indicates the PC 10, in S212 the CUPS filter 32 acquires image data for the user-specified image from the server computer (that is, from the memory 14 of the PC 10). Subsequently, the CUPS filter 32 advances to S208.

On the other hand, when the source of the print job is a client computer (S210: YES), i.e., the user ID included in the print job indicates one of the PC 82 and the PC 86, in S214 the CUPS filter 32 acquires image data for the user-specified image from the client computer (specifically, from the CIFS/Samba sharing area 98 in the PC 82 or the PC 86).

In S216 the CUPS filter 32 determines whether image data could be acquired from the client computer. when the CUPS filter 32 was unable to acquire image data from the client computer (S216: NO), in S218 the CUPS filter 32 executes an error process and subsequently advances to S208. On the other hand, when the CUPS filter 32 was able to acquire image data from the client computer (S216: YES), the CUPS filter 32 advances to S208 without executing the process in S218.

Figure 7:
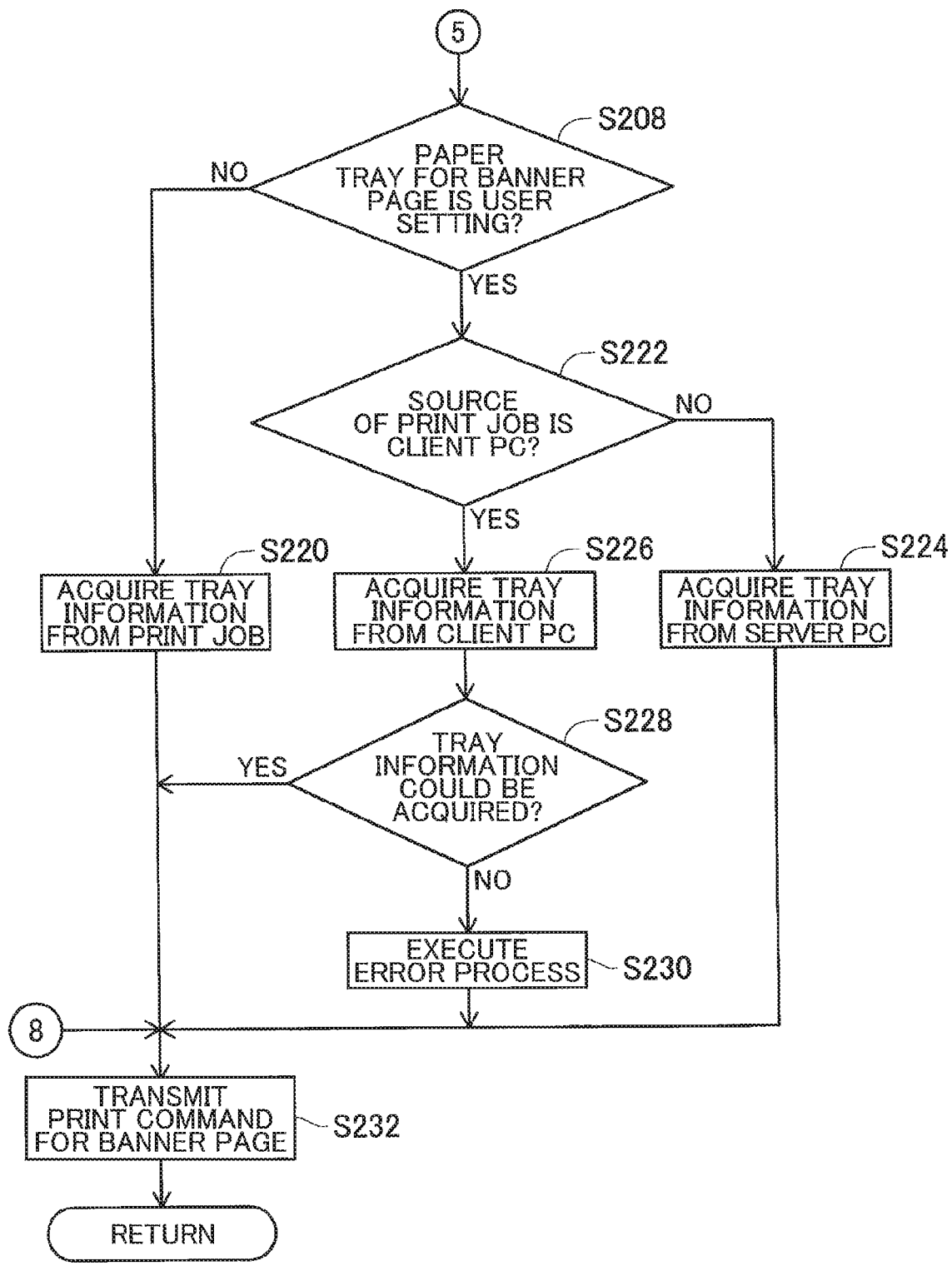
FIG. 7 is a flowchart illustrating steps in the banner page print subroutine performed in accordance with the CUPS filter of the PC in the printing system according to the first embodiment.
Figure 8:
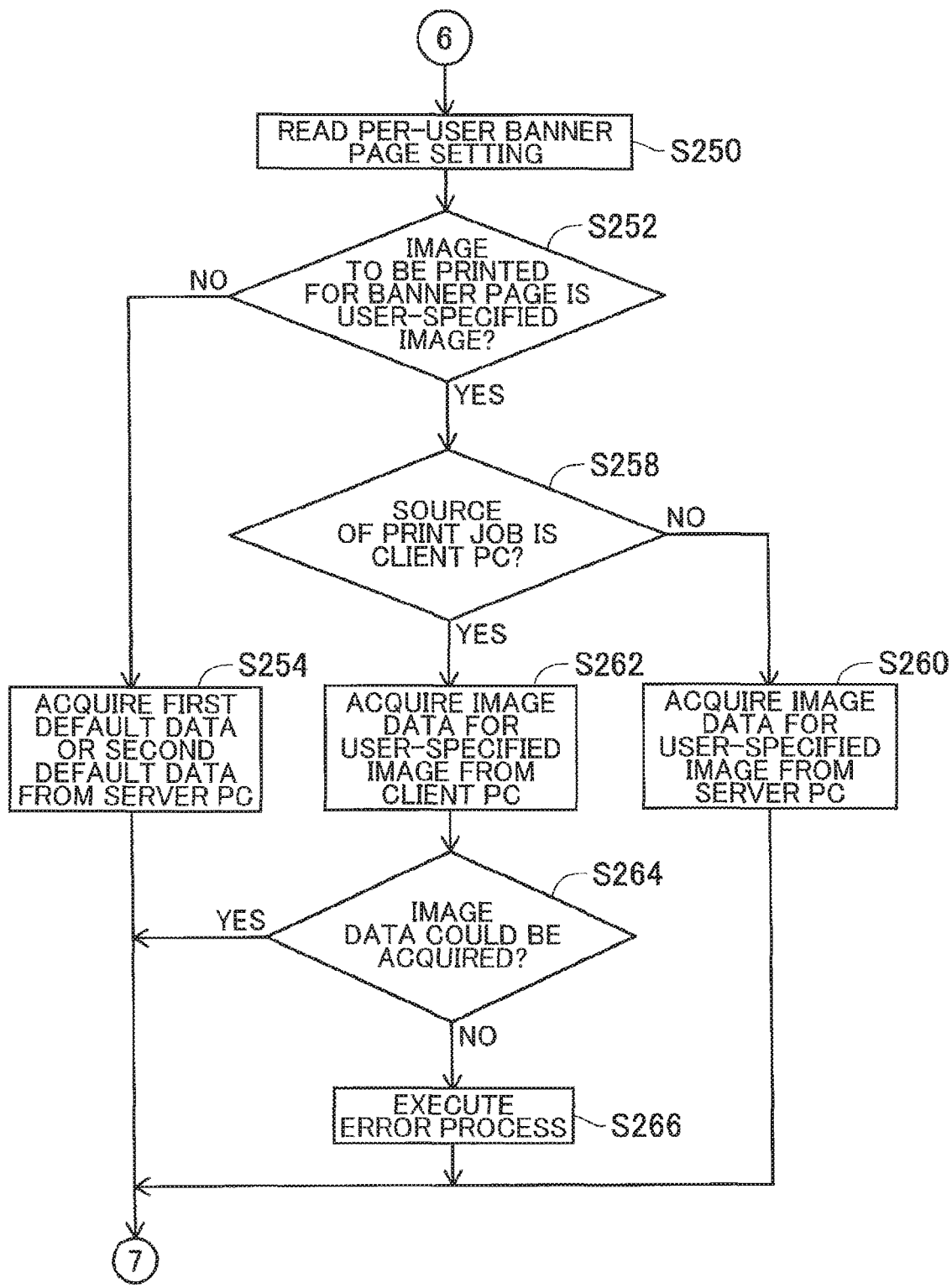
FIG. 8 is a flowchart illustrating steps in the banner page print subroutine performed in accordance with the CUPS filter of the PC in the printing system according to the first embodiment.
Figure 9:
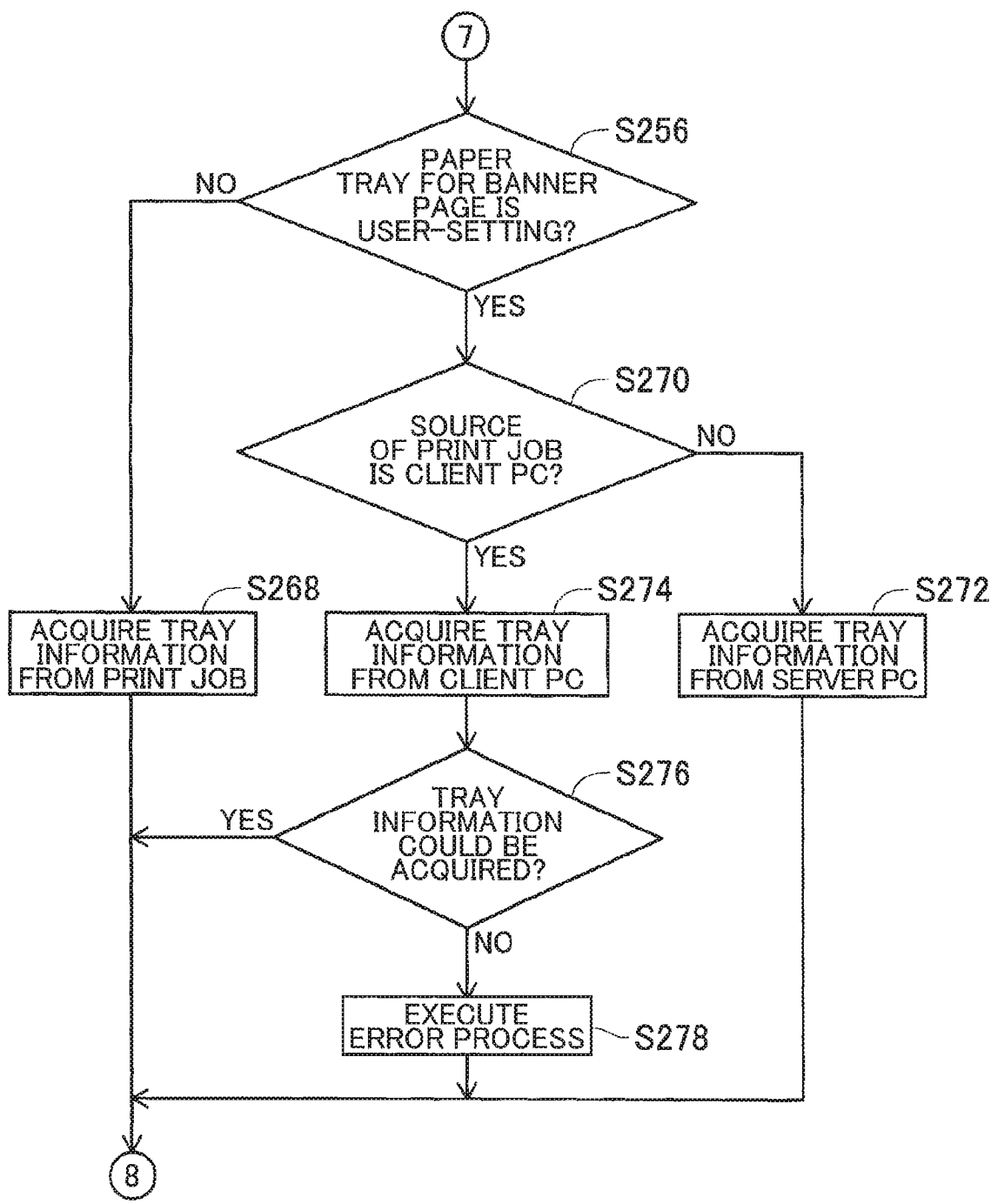
FIG. 9 is a flowchart illustrating steps in the banner page print subroutine performed in accordance with the CUPS filter of the PC in the printing system according to the first embodiment.

In S208 in FIG. 7, the CUPS filter 32 determines based on the information read in S202 whether the paper tray on the printing paper for banner pages is set to "User setting". When the paper tray for banner pages is not set to "User setting" (S208: NO), in S220 the CUPS filter 32 acquires the paper tray for printing paper set in the print job as the tray information and subsequently advances to S232.

When the paper tray for banner pages is set to "User setting" (S208: YES), in S222 the CUPS filter 32 determines whether the source of the print job stored in the data storage area 34 is a client computer. When the source of the print job is a server computer (S222: NO), in S224 the CUPS filter 32 acquires tray information from the server computer (i.e., from the PPD 36 of the PC 10 in this example). Subsequently, the CUPS filter 32 advances to S232.

On the other hand, when the source of the print job is a client computer (S222: YES), in S226 the CUPS filter 32 acquires tray information from the client computer (specifically, from the CIFS/Samba sharing area 98 of the PC 82 or the PC 86 in this case).

Then in S228 the CUPS filter 32 determines whether tray information could be acquired from the client computer. When the CUPS filter 32 was unable to acquire tray information from the client computer (S228: NO), in S230 the CUPS filter 32 executes an error process and advances to S232. On the other hand, when the CUPS filter 32 was able to acquire tray information from the client computer (S228: YES), the CUPS filter 32 advances to S232 without executing the process in S230.

In S232 the CUPS filter 32 transmits a print command for printing a banner page and image data for the image to be printed on the printing paper for the banner page to the printer 80 together with the tray information. This step completes the banner page print subroutine.

Further, when the CUPS filter 32 determines in S200 of FIG. 6 that the flag SW is not set to "J" (S200: NO), i.e., the flag SW is set to "U", in S250 of FIG. 8 the CUPS filter 32 reads the per-user banner page setting. That is, the CUPS filter 32 reads information related to the per-user banner page setting from the conditions information included in the print job stored in the data storage area 34. Thereafter, the CUPS filter 32 executes the process in S252 to S278.

The process in S252 to S278 is identical to the process in S204 to S230 described above if the description related to the per-job banner pages is replaced with a description for per-user banner pages. Accordingly, a description for the process in S252 to S278 has been omitted. After completing the process in S252 to S278, in S232 the CUPS filter 32 transmits a print command for printing a banner page and image data for the image to be printed for the banner page to the printer 80 together with the tray information. This step completes the banner page print subroutine.

After completing the banner page print subroutine, the CUPS filter 32 returns to the main routine and advances to S132. Note that the CUPS filter 32 also advances to S132 when the CUPS filter 32 determines in S120 that the flag SW is set to "N" (S120: YES). In S132 the CUPS filter 32 transmits a print command for normal pages to the printer 80. At this time, the CUPS filter 32 converts target image data to PDL data or other print data that the printer 80 can process, transmits the converted target image data and information related to print settings included in the conditions information to the printer 80 together with a print command, and deletes the print job that has been transmitted from the data storage area 34. The user ID included in the transmitted print job is maintained in the memory 14 even after the print job was deleted from the data storage area 34.

Subsequently in S134 the CUPS filter 32 updates the PC-side accumulated sheet number stored in the data storage area 34. More specifically, the CUPS filter 32 adds the number of sheets to be printed in the printing process executed based on the print command transmitted to the printer 80 to the printer-side accumulated sheet number acquired in S105 and updates the PC-side accumulated sheet number to this sum. Finally, in S136 the CUPS filter 32 transmits a close command to the OS for closing communications with the printer 80, and ends the current process.

Second Embodiment

Next, a second embodiment of the present disclosure will be described with reference to FIGS. 10 through 12, wherein like parts and components are designated with the same reference numerals as shown in the first embodiment to avoid duplicating description.

While the CUPS filter 32 and the CUPS filter 72 determine whether to insert a per-user banner page based on the printer-side accumulated sheet number and the PC-side accumulated sheet number in the first embodiment described above, the CUPS filter 32 and the CUPS filter 72 determine whether to insert a per-user banner page based on printing history information stored in the printer 80 in the second embodiment.

Specifically, the printer 80 according to the second embodiment has a function for storing printing history information as printing history required for billing management, business management, and the like. The printing history information is in a format that can be printed by the printer 80. Normally, the printing history information can be transmitted to a PC according to communications protocol such as the HTTP protocol of the network using an embedded web server (EWS) function or the SMB protocol for file sharing. This function is well known in the field of network printers.

Printing history information illustrated in FIG. 10 is accumulated and stored in the printer 80 each time a print job is received. The printing history information includes a submit time indicating the date and time that the printing process was executed for the print job; an IP address of the device that transmitted the print job to the printer 80 (such as the PC 10); a user ID indicating the source of the print job; a job name indicating the name of the print job; status information for the print job; and size information indicating the size of the printing papers included in the conditions information.

When the printer 80 receives a new print job in a state where a prescribed number of records of printing history information have been stored in the printer 80, the oldest printing history information, i.e., the printing history information that has been stored for the longest amount of time, is deleted.

When the CUPS filter 32 of the PC 10 according to the second embodiment receives a print job from the CUPS server 30, the CUPS filter 32 stores the received print job in the data storage area 34 similar to the first embodiment. Next, the CUPS filter 32 acquires all printing history information stored in the printer 80. Here, the CUPS filter 32 acquires the printing history information from the printer 80 using SMB or the EWS function of HTTP.

After acquiring the printing history information, the CUPS filter 32 extracts the printing history information for the print job printed immediately before the print job stored in the data storage area 34 (hereinafter referred to as "most recent printing history information"). Specifically, when there are no records in the acquired printing history information that have the status "printing" or "queued", the most recent printing history information is the history information for the print job last printed.

However, if there exist records in the printing history information having the status "printing" or "queued," the most recent printing history information is the printing history information of the print job scheduled to be printed last (normally the print job that was last received). Subsequently, the CUPS filter 32 identifies the user ID included in the most recent printing history information (hereinafter referred to as "most recent user ID"). The most recent user ID is an example of the first identification information.

Then, the CUPS filter 32 identifies the user ID included in the print job stored in the data storage area 34, i.e., the planned print job (hereinafter referred to as "planned user ID"). When insertion of a per-user banner page has been enabled, the CUPS filter 32 determines whether the most recent user ID is the same as the planned user ID. The planned user ID is an example of the second identification information.

When the most recent user ID is the same as the planned user ID, the source of the planned print job is the same as the source of the print job last executed (or to be executed last) on the printer 80. That is, if a print job created on the PC 82 is the planned print job, for example, then the print job executed on the printer 80 most recently was also created on the PC 82.

In this case, when the planned print job is transmitted to the printer 80, this print job, i.e., a print job created on the PC 82, is executed subsequent to another print job created on the PC 82 that was just previously transmitted to the printer 80. Accordingly, there is no need to insert a per-user banner page before the planned print job. Hence, when the most recent user ID is the same as the planned user ID, the CUPS filter 32 transmits a print command for the normal pages to the printer 80 as the print job without transmitting a print command for a per-user banner page.

On the other hand, when the most recent user ID is different from the planned user ID, the source of the planned print job is different from the source of the print job executed most recently on the printer 80. This means that, when a print job created on the PC 82 is the planned print job, for example, the print job executed most recently on the printer 80 was created on a device other than the PC 82, such as the PC 10.

When the planned print job is transmitted to the printer 80 in this case, this print job (i.e., a print job created on the PC 82) is executed after a print job transmitted to the printer 80 from a device different from the PC 82, such as the PC 10. Accordingly, it is necessary to insert a per-user banner page before the planned print job.

Hence, when the most recent user ID is different from the planned user ID, the CUPS filter 32 first transmits a print command for a per-user banner page to the printer 80 and subsequently transmits a print command for the normal pages to the printer 80 as the print job. In this way, the second embodiment can obtain the same effects described in the first embodiment.

Note that, in the second embodiment, the process nearly the same as the process in the first embodiment is executed when insertion of a per-job banner page has been enabled. However, in the second embodiment, insertion of a per-job banner page can be disabled according to the paper size of the normal pages, i.e., the size of the printing paper on which images based on the target image data are to be printed.

Specifically, the settings screen 100 described above is displayed on the LCD of the PC executing the print job. In the second embodiment, in addition to the pull-down menus 102*a*-102*c* and the pull-down menus 106*a*-106*c*, the settings screen 100 further includes a Cancel button (not illustrated) for canceling the insertion of a per-job banner page depending on the paper size. When the Cancel button is operated, a setting for disabling insertion of a per-job banner page depending on the paper size (hereinafter referred to as "disable setting") is set to ON, and information indicating that the disable setting is ON is included in the conditions information.

Further, prior to transmitting a print job to the printer 80, the CUPS filter 32 determines whether insertion of a per-job banner page has been enabled, as described in the first embodiment. However, while the CUPS filter 32 in the first embodiment always transmits a print command for a per-job banner page when insertion of per-job banner pages is enabled, the CUPS filter 32 in the second embodiment determines based on the conditions information whether the disable setting has been set to ON when insertion of per-job banner pages is enabled.

When the disable setting is set to ON, the CUPS filter 32 determines whether the size of paper to be used in the printing process based on the planned print job (hereinafter referred to as "planned paper size") is the same as the size of paper used in the printing process executed just previously on the printer 80 (hereinafter referred to as "most recent paper size").

That is, the CUPS filter 32 acquires the paper size for the normal pages based on the conditions information included in the print job stored in the data storage area 34 as the planned paper size. Further, the CUPS filter 32 acquires size information included in the most recent printing history information as the most recent paper size. Then, the CUPS filter 32 determines whether the planned paper size is the same as the most recent paper size.

If the planned paper size is different from the most recent paper size, the size of paper on which image is to be printed based on the planned print job differs from the size of paper on which image was printed based on the print job executed by the printer 80 just prior to the planned print job. In this case, the previously executed print job can be easily differentiated from the subsequently executed print job based on the difference in paper sizes without inserting a banner page between the two print jobs. Therefore, the CUPS filter 32 does not execute the insertion of a per-job banner page when the planned paper size differs from the most recent paper size, even though insertion of per-job banner pages has been enabled. As a result, waste of printing papers that is to be used as banner pages can be suppressed.

On the other hand, when the planned paper size is the same as the most recent paper size, the size of the paper on which image is to be printed based on the planned print job is the same as the size of paper on which image was printed based on the print job executed on the printer 80 just prior to the planned print job. In this case, the previously executed print job and subsequently executed print job cannot be differentiated based on paper size.

Therefore, when insertion of per-job banner pages has been enabled and the planned paper size is the same as the most recent paper size, the CUPS filter 32 inserts a per-job banner page before the planned print job. Thus, print jobs that cannot be differentiated by a difference in paper size can easily be differentiated by inserting a banner page.

<Process of CUPS Filter>

Figure 11:
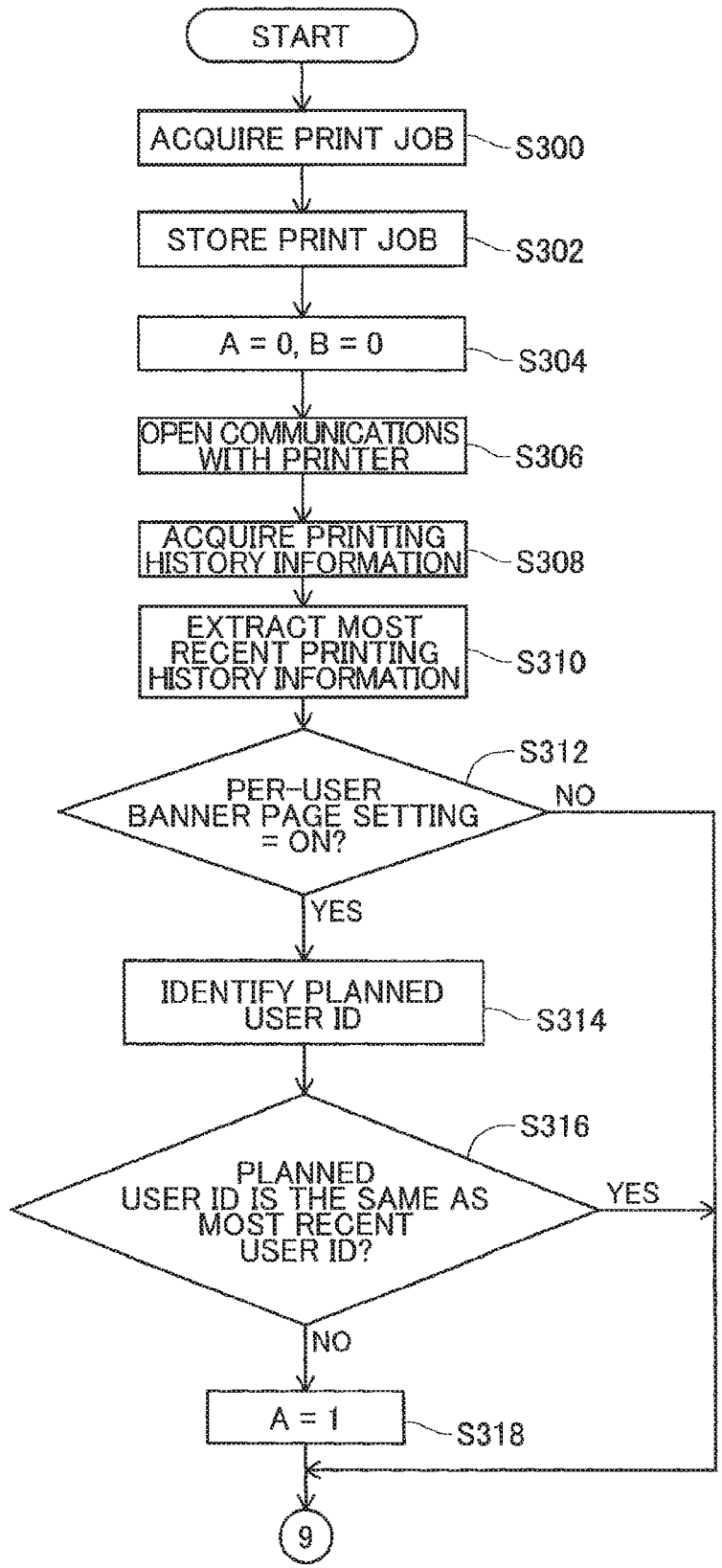
FIG. 11 is a flowchart illustrating steps in a process performed in accordance with a CUPS filter of a PC in a printing system according to a second embodiment.
Figure 12:
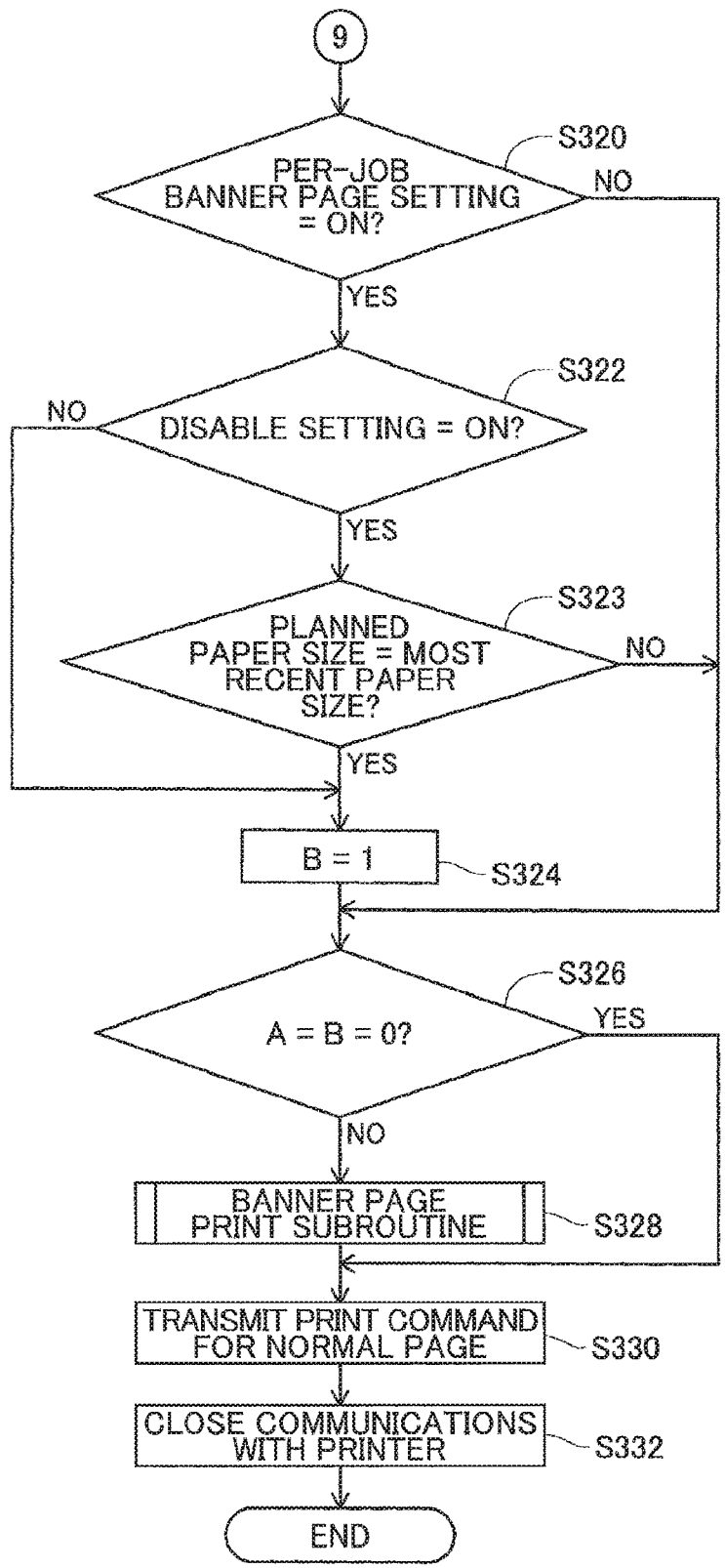
FIG. 12 is a flowchart illustrating steps in a process performed in accordance with the CUPS filter of the PC in the printing system according to the second embodiment.

The CUPS filter 32 and the CUPS filter 72 execute the process in the second embodiment described above, including the determination on whether to insert a banner page, according to the flowcharts illustrated in FIGS. 11 and 12. Since the process executed by the CUPS filter 32 and the process executed by the CUPS filter 72 are identical to each other, only the process executed in accordance with the CUPS filter 32 will be described below, and the process executed in accordance with the CUPS filter 72 will be omitted.

In S300 at the beginning of the process in FIG. 11, the CUPS filter 32 acquires a print job outputted from the CUPS server 30 and in S302 stores the acquired print job in the data storage area 34. In S304 the CUPS filter 32 sets flags A and B to "0". Note that Flag A indicates whether insertion of per-user banner pages has been enabled, while flag B indicates whether insertion of per-job banner pages has been enabled. Here, flag A="0" indicates that per-user banner pages are not to be inserted, and flag B="0" indicates that per-job banner pages are not to be inserted.

In S306 the CUPS filter 32 transmits a command to the OS to open communications with the printer 80. In S308 the CUPS filter 32 acquires printing history information from the printer 80 and in S310 extracts the most recent printing history information from the acquired printing history information. In S312 the CUPS filter 32 determines whether the per-user banner page setting is set to ON, i.e., whether insertion of per-user banner pages has been enabled.

When the per-user banner page setting is set to ON (S312: YES), in S314 the CUPS filter 32 identifies the planned user ID. In S316 the CUPS filter 32 determines whether the user for the planned print job is the same as the user for the print job included in the most recent printing history information. In other words, the CUPS filter 32 determines whether the planned user ID is the same as the most recent user ID.

When the most recent user ID is different from the planned user ID (S316: NO), in S318 the CUPS filter 32 sets flag A to "1". Flag A="1" indicates that a per-user banner page is to be inserted. Subsequently, the CUPS filter 32 advances to S320. On the other hand, when the most recent user ID is the same as the planned user ID (S316: YES), the CUPS filter 32 skips S318 and advances directly to S320.

Note that the CUPS filter 32 also advances to S320 when determining in S312 that the per-user banner page setting is set to OFF (S312: NO).

In S320 the CUPS filter 32 determines whether the per-job banner page setting is ON, i.e., whether insertion of per-job banner pages has been enabled. When the per-job banner page setting is ON (S320: YES), in S322 the CUPS filter 32 determines whether the disable setting is ON. When the disable setting is ON (S322: YES), in S323 the CUPS filter 32 identifies the planned paper size and the most recent paper size, and determines whether the planned paper size and most recent paper size are the same.

When the planned paper size is the same as the most recent paper size (S323: YES), the CUPS filter 32 advances to S324. The CUPS filter 32 also advances to S324 when the disable setting is set to OFF in S322 (S322: NO). In S324 the CUPS filter 32 sets flag B to "1" indicating that a per-job banner page is to be inserted, and advances to S326. The CUPS filter 32 advances to S326 without executing the process in S324 when the per-job banner page setting is set to OFF in S320 (S320: NO) and when the planned paper size is different from the most recent paper size in S323 (S323: NO).

In S326 the CUPS filter 32 determines whether both flag A and flag B are set to "0". When either flag A or flag B is not set to "0" (S326: NO), i.e., one of flag A and flag B is set to "1", in S328 the CUPS filter 32 executes the banner page print subroutine. This banner page print subroutine is substantially the same as the banner page print subroutine according to the first embodiment illustrated in FIGS. 6 through 9. Hence, only the steps that differ from the first embodiment will be described here.

In S200 at the beginning of the banner page print subroutine according to the second embodiment, the CUPS filter 32 determines whether flag B is set to "1". When flag B is set to "1", the CUPS filter 32 executes the process beginning from S202 as in the first embodiment. On the other hand, when flag B is set to "0", i.e., when flag A is set to "1", the CUPS filter 32 executes the process beginning from S250 as in the first embodiment.

After completing the banner page print subroutine, the CUPS filter 32 returns to the main routine and advances to S330. Note that the CUPS filter 32 also advances to S330 when both flag A and flag B are set to "0" in S326 (S326: YES). In S330 the CUPS filter 32 transmits a print command for normal pages to the printer 80. In S332 the CUPS filter 32 transmits a command to the OS to close communications with the printer 80, and subsequently ends the current process.

Modifications

While the description has been made in detail with reference to the embodiments, it would be apparent to those skilled in the art that various modifications and variations may be made thereto. For example, while a disable setting is provided for per-job banner pages in the second embodiment described above, a disable setting may also be provided for per-user banner pages.

Further, a case in which the CPU 12 executes the processes illustrated in FIGS. 3 through 9, 11, and 12 has been described in the above embodiments, but these processes may be executed using an ASIC or other logic integrated circuit, or may be executed through a combination of a CPU, an ASIC, and other logic integrated circuit. Further, a banner page is inserted as a separating sheet for separating the current print job from a preceding print job in the above embodiments. However, a blank sheet may instead be inserted as the separating sheet.

REMARKS

The CPU 12 that executes the processes in S100 and S300 is an example of the (a) acquiring a print job. The CPU 12 that executes the process in S105 is an example of the (b) acquiring the second accumulated sheet number. The CPU 12 that executes the process in S112 is an example of the (c) acquiring the first accumulated sheet number. The CPU 12 that executes the process in S114 is an example of the (d) determining. The CPU 12 that executes the processes in S130 and S132 is an example of the (e) transmitting a first print job. The CPU 12 that executes the process in S132 is an example of the (f) transmitting a second printing job. The CPU 12 that executes the process in S134 is an example of the (g) updating. The CPU 12 that executes the process in S126 is an example of the (h) determining whether the communication interface is a USB interface. The CPU 12 that executes the process in S105 is an example of the (h) acquiring the status information from the printer. The CPU 12 that executes the process in S116 is an example of the (i) determining whether the printer is in a standby state. The CPU 12 that executes the processes in S210 or S222 is an example of the (h) determining whether a source of the print job is a second information processing apparatus. The CPU 12 that executes the process in S214 is an example of the (i) acquiring image data. The CPU 12 that executes the process in S226 is an example of the (i) acquiring tray information. The CPU 12 that executes the process in S310 is an example of the (b) acquiring first identification information. The CPU 12 that executes the process in S314 is an example of the (c) acquiring second identification information. The CPU 12 that executes the process in S316 is an example of the (d) determining. The CPU 12 that executes the processes in S328 and S330 is an example of the (e) transmitting a first print job. The CPU 12 that executes the process in S330 is an example of the (f) transmitting a second print job.

What is claimed is:

1. A non-transitory computer readable storage medium storing a set of program instructions for an information processing apparatus, the information processing apparatus comprising:
   a processor;
   a communication interface configured to allow the information processing apparatus to communicate with a printer; and
   a storage configured to store therein a first accumulated sheet number, the printer being configured to:
   receive a print job transmitted from the information processing apparatus via the communication interface; and
   each time the printer receives the print job from the information processing apparatus, execute a printing process based on the received print job, the printer storing therein a second accumulated sheet number, the printer being configured such that, each time the printer executes a printing process, the printer updates the second accumulated sheet number by adding the number of sheets that have been printed by the printer based on the print job, the set of program instructions, when executed by the processor, causing the information processing apparatus to perform:
   (a) acquiring a print job to be transmitted to the printer;

(b) acquiring the second accumulated sheet number from the printer via the communication interface;

(c) acquiring the first accumulated sheet number from the storage;

(d) determining whether the acquired second accumulated sheet number is equal to the acquired first accumulated sheet number;

when it is determined that the acquired second accumulated sheet number is different from the acquired first accumulated sheet number, (e) transmitting a first print job to the printer via the communication interface, wherein the first print job is such a print job that includes both the acquired print job and a print command indicating that a separating sheet should be inserted, the separating sheet serving as a boundary between the acquired print job and another print job;

when it is determined that the acquired second accumulated sheet number is equal to the acquired first accumulated sheet number, (f) transmitting a second print job to the printer via the communication interface, wherein the second print job is such a print job that includes the acquired print job but does not include the print command indicating that the separating sheet should be inserted; and (g) updating the first accumulated sheet number stored in the storage by adding, to the acquired second accumulated sheet number, the number of sheets to be printed by the printer based on the transmitted print job.

2. The non-transitory computer readable storage medium according to claim 1, wherein the set of program instructions, when executed by the processor, causes the information processing apparatus to further perform:

when it is determined that the acquired first accumulated sheet number is greater than the acquired second accumulated sheet number, (h) determining whether the communication interface is a USB interface, and wherein, when it is determined that the communication interface is the USB interface, the second print job is transmitted to the printer.

3. The non-transitory computer readable storage medium according to claim 1, wherein the set of program instructions, when executed by the processor, causes the information processing apparatus to further perform:

when it is determined that the acquired first accumulated sheet number is greater than the acquired first accumulated sheet number, (h) determining whether the communication interface is a network interface, and wherein, when it is determined that the communication interface is a network interface, the first print job is transmitted to the printer.

4. The non-transitory computer readable storage medium according to claim 1, wherein the printer is further configured to store therein status information indicative of a current status of the printer, wherein the set of program instructions, when executed by the processor, causes the information processing apparatus to further perform:

(h) acquiring the status information from the printer via the communication interface; and when it is determined that the acquired second accumulated sheet number is equal to the acquired first accumulated sheet number, (i) determining, based on the acquired status information, whether the printer is in a standby state, and wherein, when it is determined that the printer is not in the standby state, the first print job is transmitted to the printer.

5. The non-transitory computer readable storage medium according to claim 1, wherein the set of program instructions, when executed by the processor, causes the information processing apparatus to further perform:

when it is determined that the first print job should be transmitted to the printer, (h) determining whether a source from which the print job has been acquired is a second information processing apparatus different from the information processing apparatus; and when it is determined that the source of the print job is the second information processing apparatus, (i) acquiring, from the second information processing apparatus, image data for an image to be printed on a printing sheet for the separating sheet, and wherein the first print job including the acquired image data is transmitted to the printer via the communication interface.

6. The non-transitory computer readable storage medium according to claim 1, wherein the set of program instructions, when executed by the processor, causes the information processing apparatus to further perform:

when it is determined that the first print job should be transmitted to the printer, (h) determining whether a source from which the print job has been acquired is a second information processing apparatus different from the information processing apparatus; and when it is determined that the source of the print job is the second information processing apparatus, (i) acquiring tray information from the second information processing apparatus, the tray information being indicative of a paper tray from which a printing sheet for the separating sheet should be supplied, and wherein the first print job including the acquired tray information is transmitted to the printer via the communication interface.

7. A non-transitory computer readable storage medium storing a set of program instructions for an information processing apparatus, the information processing apparatus comprising: a processor;

a communication interface configured to allow the information processing apparatus to communicate with a printer; and a storage, the printer being configured to;

receive a print job transmitted from the information processing apparatus via the communication interface, the print job including identification information used to identify a source of the print job;

execute a printing process based on the received print job; and store therein the identification information included in the received print job;

the set of program instructions, when executed by the processor, causing the information processing apparatus to perform:

(a) acquiring a print job to be transmitted to the printer; the print 10b including identification information;

(b) acquiring first identification information from the printer via the communication interface, the first identification information being the identification information stored in the printer and indicative of a source of a latest print job received by the printer;

(c) acquiring second identification information, the second identification information being the identification information included in the acquired print job;

(d) determining whether the acquired first identification information is the same as the acquired second identification information;

when it is determined that the acquired first identification information is different from the acquired second identification information; (e) transmitting a first print job to the printer via the communication interface, wherein the first print job is such a print job that includes both the acquired print job and a print command indicating that a separating sheet should be inserted, the separating sheet serving as a boundary between the acquired print job and another print job; and when it is determined that the acquired first identification information is the same as the acquired second identification information, (f) transmitting a second print job to the printer via the communication interface, wherein the second print job is such a print job that includes the acquired print job but does not include the print command indicating that the separating sheet should be inserted.

8. The non-transitory computer readable storage medium according to claim 7, wherein the set of program instructions, when executed by the processor, causes the information processing apparatus to further perform:

when it is determined that the first print job should be transmitted to the printer, (g) determining whether the source from which the print job has been acquired is a second information processing apparatus different from the information processing apparatus; and when it is determined that the source of the acquired print job is the second information processing apparatus, (h) acquiring, from the second information processing apparatus, image data for an image to be printed on a printing sheet for the separating sheet, and wherein the first print job including the acquired image data is transmitted to the printer via the communication interface together with the first print job.

9. The non-transitory computer readable storage medium according to claim 7, wherein the set of program instructions, when executed by the processor, causes the information processing apparatus to further perform:

when it is determined that the first print job should be transmitted to the printer, (g) determining whether the source from which the print job has been acquired is a second information processing apparatus different from the information processing apparatus; and when it is determined that the source of the print job is the second information processing apparatus, (h) acquiring tray information from the second information processing apparatus, the tray information being indicative of a paper tray from which a printing sheet for the separating sheet should be supplied, and wherein the first print job including the acquired tray information is transmitted to the printer via the communication interface.

10. An information processing apparatus comprising:
a processor;
a communication interface configured to allow the information processing apparatus to communicate with a printer; and
a storage configured to store therein a first accumulated sheet number,
the printer being configured to:
receive a print job transmitted from the information processing apparatus via the communication interface; and
each time the printer receives the print job from the information processing apparatus, execute a printing process based on the received print job, the printer storing therein a second accumulated sheet number, the printer being configured such that, each time the printer executes a printing process, the printer updates the second accumulated sheet number by adding the number of sheets that have been printed by the printer based on the print job,
the processor being configured to perform:
(a) acquiring a print job to be transmitted to the printer;
(b) acquiring the second accumulated sheet number from the printer via the communication interface;
(c) acquiring the first accumulated sheet number from the storage;
(d) determining whether the acquired second accumulated sheet number is equal to the acquired first accumulated sheet number;
when it is determined that the acquired second accumulated sheet number is different from the acquired first accumulated sheet number, (e) transmitting a first print job to the printer via the communication interface, wherein the first print job is such a print job that includes both the acquired print job and a print command indicating that a separating sheet should be inserted, the separating sheet serving as a boundary between the acquired print job and another print job;
when it is determined that the acquired second accumulated sheet number is equal to the acquired first accumulated sheet number, (f) transmitting a second print job to the printer via the communication interface, wherein the second print job is such a print job that includes the acquired print job but does not include the print command indicating that the separating sheet should be inserted; and
(g) updating the first accumulated sheet number stored in the storage by adding, to the acquired second accumulated sheet number, the number of sheets to be printed by the printer based on the transmitted print job.

11. An information processing apparatus comprising:
a processor;
a communication interface configured to allow the information processing apparatus to communicate with a printer; and
a storage,
the printer being configured to;
receive a print job transmitted from the information processing apparatus via the communication interface, the print job including identification information used to identify a source of the print job;
execute a printing process based on the received print job; and
store therein the identification information included in the received print job,
the processor being configured to perform;
(a) acquiring a print job to be transmitted to the printer, the print job including identification information;
(b) acquiring first identification information from the printer via the communication interface, the first identification information being the identification information stored in the printer and indicative of a source of a latest print job received by the printer;
(c) acquiring second identification information, the second identification information being the identification information included in the acquired print job;
(d) determining whether the acquired first identification information is the same as the acquired second identification information;

when it is determined that the acquired first identification information is different from the acquired second identification information, (e) transmitting a first print job to the printer via the communication interface, wherein the first print job is such a print job that includes both the acquired print job and a print command indicating that a separating sheet should be inserted, the separating sheet serving as a boundary between the acquired print job and another print job; and when it is determined that the acquired first identification information is the same as the acquired second identification information, (f) transmitting a second print job to the printer via the communication interface, wherein the second print job is such a print job that includes the acquired print job but does not include the print command indicating that the separating sheet should be inserted.

\* \* \* \* \*